US012580817B2

(12) United States Patent　　　　　(10) Patent No.: US 12,580,817 B2
Gad et al.　　　　　　　　　　　　　　(45) Date of Patent: Mar. 17, 2026

(54) CONFLICT MITIGATION OF A RADIO ACCESS NETWORK

(71) Applicant: Dell Products, L.P., Round Rock, TX (US)

(72) Inventors: Omar Gad, London (GB); Yassin Chaddad, Banafseg (EG); Amr Morsey, Illidge (EG); Nada Elsammak, Illidge (EG)

(73) Assignee: DELL PRODUCTS L.P., Round Rock, TX (US)

( * ) Notice: Subject to any disclaimer, the term of this patent is extended or adjusted under 35 U.S.C. 154(b) by 273 days.

(21) Appl. No.: 18/338,595

(22) Filed: Jun. 21, 2023

(65) Prior Publication Data

US 2024/0430164 A1　　Dec. 26, 2024

(51) Int. Cl.
H04L 12/00　　　　(2006.01)
H04L 41/0859　　(2022.01)
(Continued)

(52) U.S. Cl.
CPC ...... H04L 41/0873 (2013.01); H04L 41/0863 (2013.01); H04L 43/16 (2013.01)

(58) Field of Classification Search
CPC . H04L 41/0873; H04L 41/0863; H04L 43/16; H04L 41/0816; H04W 24/02
(Continued)

(56) References Cited

U.S. PATENT DOCUMENTS 9,930,573 B2 * 3/2018 Cui ..................... H04L 41/0803
10,778,519 B2 * 9/2020 Vuggrala ................ H04L 43/16
(Continued)

FOREIGN PATENT DOCUMENTS

WO　　WO-2011077011 A1 * 6/2011 ............ H04W 24/02
WO　　　2022186912 A1 9/2022
(Continued)

OTHER PUBLICATIONS

International Search report and written Opinion received for PCt Application Serial No. PCT/US2023/036195 dated Mar. 15, 2024, 22 pages.
(Continued)

*Primary Examiner* — Frantz Coby
(74) *Attorney, Agent, or Firm* — Amin, Turocy & Watson, LLP

(57) ABSTRACT

The described technology is generally directed towards conflict management of applications implemented on a radio access network (RAN) network. Various embodiments are presented to enable identification of a potential conflict (e.g., where an application is being onboarded) as well as a present conflict (e.g., where two or more applications are already operational). Conflicts may directly affect a control target, e.g., two applications are trying to control the same target. Conflicts may indirectly affect a control target, two applications affect a first metric and a second metric, but a third metric is affected. Conflict resolution includes preventing an application onboarding, terminating operation of an application, identifying causes unrelated to the application, rolling back operation of the RAN to a prior condition (e.g., pre-conflict condition), and suchlike. Conflict resolution can be conducted at a RAN intelligent controller (RIC).

20 Claims, 14 Drawing Sheets

(51) Int. Cl.
H04L 41/0873 (2022.01)
H04L 43/16 (2022.01)

(58) Field of Classification Search
USPC ........................................................ 370/252
See application file for complete search history.

(56) References Cited

U.S. PATENT DOCUMENTS

| | | | |
|---|---|---|---|
| 2009/0055340 A1 | 2/2009 | Lakshminarayanan et al. | |
| 2020/0296223 A1* | 9/2020 | Yan ........................ | H04M 15/80 |
| 2021/0344574 A1* | 11/2021 | Tiwari ................... | H04W 24/02 |
| 2022/0283882 A1 | 9/2022 | Singh et al. | |
| 2023/0336299 A1* | 10/2023 | Manolakos ........... | H04W 24/10 |
| 2024/0022923 A1* | 1/2024 | Arora .................... | H04W 24/02 |
| 2024/0098568 A1 | 3/2024 | Curic et al. | |
| 2024/0106704 A1* | 3/2024 | Chau ...................... | H04L 43/14 |
| 2024/0129187 A1* | 4/2024 | Panje .................. | H04L 41/5019 |
| 2024/0205688 A1* | 6/2024 | Vanjare ................. | H04W 16/10 |
| 2024/0205808 A1* | 6/2024 | Vanjare ................. | H04L 41/082 |
| 2024/0205868 A1* | 6/2024 | Chun .................... | H04W 48/16 |
| 2024/0259879 A1* | 8/2024 | Ranganath .......... | H04L 41/5054 |
| 2024/0284436 A1 | 8/2024 | Kak et al. | |
| 2024/0414613 A1* | 12/2024 | Wang .................... | H04L 41/082 |
| 2024/0422516 A1* | 12/2024 | Dehghan ............... | H04W 28/16 |
| 2024/0422622 A1 | 12/2024 | Grayson et al. | |
| 2025/0193078 A1* | 6/2025 | Yamasaki ............. | B60R 16/023 |
| 2025/0247296 A1* | 7/2025 | Vaishnavi ............. | H04W 24/02 |

FOREIGN PATENT DOCUMENTS

| | | | |
|---|---|---|---|
| WO | 2023/091664 A1 | 5/2023 | |
| WO | WO-2024145428 A1 * | 7/2024 | ............ H04W 48/16 |

OTHER PUBLICATIONS

Adamczyk, Cezary "Challenges for Conflict Mitigation in O-RAN's RAN Intelligent Controllers", IEEE, 2023, pp. 1-6.

Adamczyk et al., "Conflict Mitigation Framework and Conflict Detection in O-RAN Near-RT RIC", Arxiv:2305.07117v1, May 11, 2023, 7 pages.

O-RAN.WG3.RICARCH-R003-v04.00 O-RAN Working Group 3 (Near-Real-time RAN Intelligent Controller and E2 Interface Workgroup) Near-RT RIC Architecture, Technical Specification, 2023, 120 pages.

International Search Report and Written Opinion received for PCT Application Serial No. PCT/US2023/036301 dated Jun. 20, 2024, 32 pages.

"O-RAN Working Group 1 Use Cases Detailed Specification" O-RAN.WG1.Use-Cases-Detailed-Specification-R003-v10.00: Technical Specification. O-RAN Alliance 2023 (182 pages).

"O-RAN Working Group 3 (Near-Real-time RAN Intelligent Controller and E2 Interface Workgroup): Near-RT RIC Architecture" O-RAN Working Group 3 (Near-Real-time RAN Intelligent Controller and E2 Interface Workgroup) Near-RT RIC Architecture: Technical Specification. O-RAN Alliance 2023 (2 pages).

Mnih et al., "Human-level control through deep reinforcement learning" vol. 518 Nature doi:10.1038/nature14236 Feb. 26, 2015. (13 pages).

Notification Concerning Transmittal of Copy of International Preliminary Report on Patentability for International Application No. PCT/US2023/036301 dated Jan. 2, 2026.

Non-Final Office Action received for U.S. Appl. No. 18/483,049 dated Feb. 2, 2026, 27 pages.

Notification Concerning Transmittal of Copy of International Preliminary Report on Patentability for International Application No. PCT/US2023/036195 dated Dec. 26, 2025.

* cited by examiner

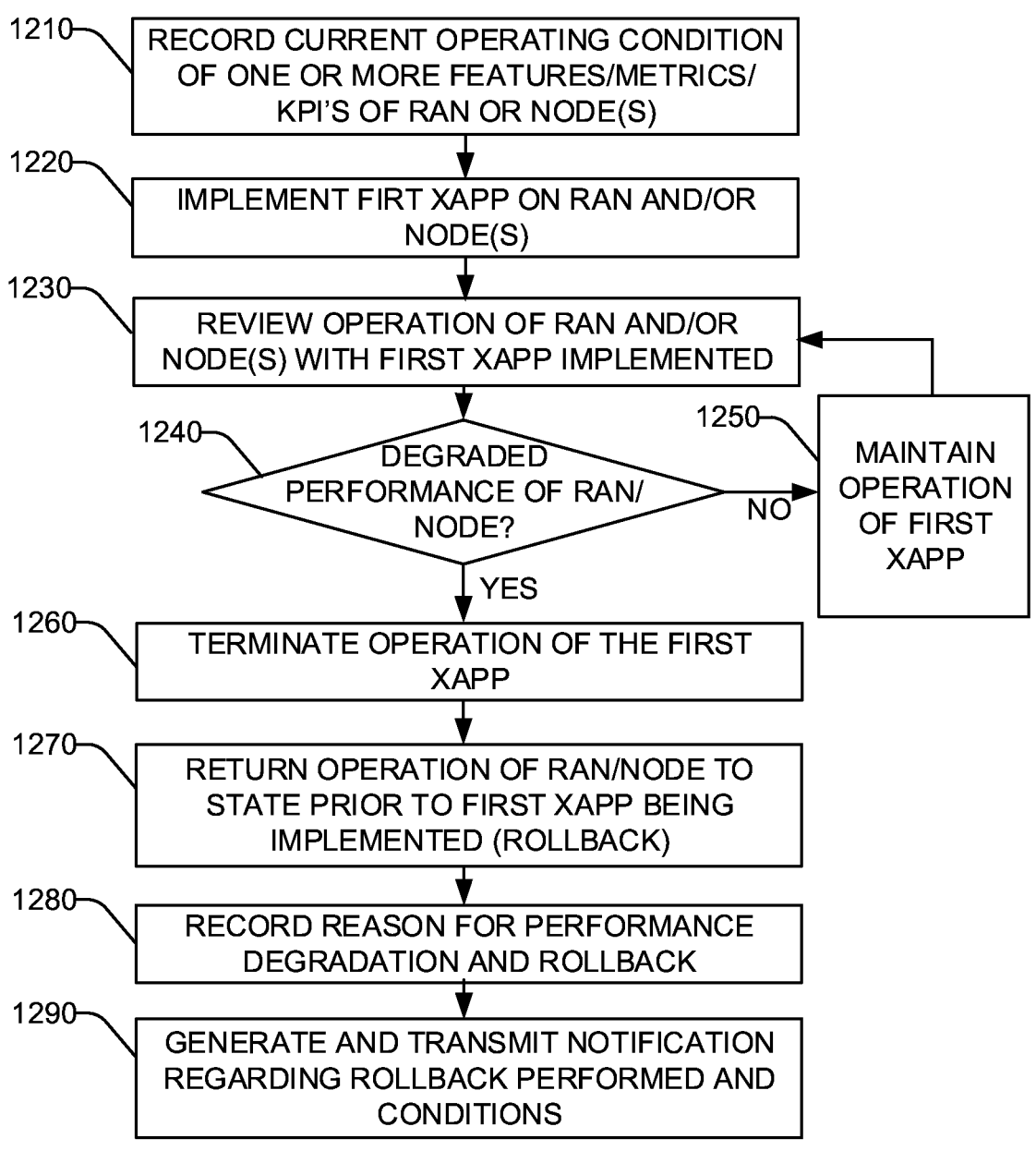

1210 RECORD CURRENT OPERATING CONDITION OF ONE OR MORE FEATURES/METRICS/ KPI'S OF RAN OR NODE(S)

1220 IMPLEMENT FIRT XAPP ON RAN AND/OR NODE(S)

1230 REVIEW OPERATION OF RAN AND/OR NODE(S) WITH FIRST XAPP IMPLEMENTED

1240 DEGRADED PERFORMANCE OF RAN/ NODE?

1250 MAINTAIN OPERATION OF FIRST XAPP

NO

YES

1260 TERMINATE OPERATION OF THE FIRST XAPP

1270 RETURN OPERATION OF RAN/NODE TO STATE PRIOR TO FIRST XAPP BEING IMPLEMENTED (ROLLBACK)

1280 RECORD REASON FOR PERFORMANCE DEGRADATION AND ROLLBACK

1290 GENERATE AND TRANSMIT NOTIFICATION REGARDING ROLLBACK PERFORMED AND CONDITIONS

FIG. 12

1310 — RECEIVE AN ONBOARDING REQUEST FOR AN XAPP

1320 — IDENTIFYING A CONTROL PARAMETER TO BE MODIFIED BY THE XAPP

1330 — REVIEW HISTORICAL DATA REGARDING THE CONTROL PARAMETER TO BE MODIFIED BY THE XAPP

1340 — HAS CONTROL PARAMETER UNDERGONE ROLLBACK?

1350 — IMPLEMENT OPERATION OF THE XAPP

NO

YES

1360 — WILL XAPP CAUSE CONFLICT?

NO

YES

1370 — DENY ONBOARDING OF THE XAPP

1380 — UPDATE ROLLBACK INFORMATION

1400

CONFLICT MITIGATION OF A RADIO ACCESS NETWORK

BACKGROUND

Radio access networks (RANs) provide wide-area wireless connectivity to mobile devices. A RAN can be constructed from devices manufactured by disparate vendors. Given the potentially vast scale and complexity of RANs developed to meet the ever-increasing demand for cellular communications, various vendor consortiums have been formed with a view to generating specifications to facilitate configurations, techniques, methods, equipment, etc., for respective communications on a RAN. Such consortiums include the Third Generation Partnership Project (3GPP), Long-Term Evolution Fourth Generation (LTE 4G), Fifth Generation/New Radio (5G, 5G/NR), and most recently, the Open-Radio Access Network (O-RAN).

An impetus of O-RAN is for an open, disaggregated RAN, which can be achieved by splitting the RAN architecture, applications (e.g., xApps), and protocols into different, independent components. Disaggregation is anticipated to reduce energy consumption, improve system performance, and allow for rapid, open innovation in different components while ensuring a multi-vendor, vendor agnostic, operability network.

The above-described background is merely intended to provide a contextual overview of some current issues and is not intended to be exhaustive. Other contextual information may become further apparent upon review of the following detailed description.

SUMMARY

The following presents a simplified summary of the disclosed subject matter to provide a basic understanding of one or more of the various embodiments described herein. This summary is not an extensive overview of the various embodiments. It is intended neither to identify key or critical elements of the various embodiments nor to delineate the scope of the various embodiments. The sole purpose of the Summary is to present some concepts of the disclosure in a streamlined form as a prelude to the more detailed description that is presented later.

In one or more embodiments described herein, systems, devices, computer-implemented methods, configurations, apparatus, and/or computer program products are presented to identify and address operational conflict between applications implemented on a RAN.

According to one or more embodiments, a computer-implemented method is provided, wherein the method comprises monitoring, by a device comprising a processor, operation of a first control parameter, wherein the first control parameter is configured to control operation of a feature of network equipment that is part of a radio access network (RAN), and, based on a defined performance metric, detecting, by the device, a threshold degradation in performance of the operation of the feature resulting from usage of the first control parameter. In an embodiment, the RAN is an Open-RAN. In a further embodiment, the device can be located in one of a real-time RAN intelligent controller (RIC), a near-real-time RIC, or a non-real-time RIC.

In an embodiment, the method can further comprise identifying, by the device, a first operation of a first application (xApp) configured to adjust the first control parameter and further identifying, by the device, a second operation of a second xApp operating to adjust the first control parameter.

Further, in response to determining that the first operation and the second operation conflict to cause deleterious operation of the first control parameter, the embodiments can include terminating, by the device, the first operation of the first xApp, and further rolling back, by the device, the operation of the feature to a stored configuration from prior to the first xApp being implemented, wherein the first control parameter is modifiable by the second operation of the second xApp.

In a further embodiment, the method can further comprise identifying, by the device, an adjustment of the operation of the feature to achieve the rolling back, the first xApp, the second xApp, and one or more conditions of the conflict, and further storing, by the device, rollback information, wherein the rollback information comprises information representative of the adjustment, the first xApp, the second xApp, the first control parameter, the first operation of the first xApp, the second operation of the second xApp, and the conditions of the conflict.

In another embodiment, the method can further comprise (i) receiving, by the device, a request to onboard a third xApp, (ii) retrieving, by the device, subscription information of the third xApp based on the onboard request, wherein the subscription information comprises a second control parameter to be adjusted by the third xApp, and a third operation of the third xApp configured to adjust operation using the second control parameter, (iii) comparing, by the device, the subscription information of the third xApp with the rollback information, (iv) determining, by the device, the first control parameter and the second control parameter are a same parameter, and (v) generating, by the device, a warning indicating the third xApp is configured to adjust operation using the first control parameter, wherein usage of the first control parameter has been determined to have been previously involved in a conflict between the first xApp and the second xApp. In a further embodiment, the method can further comprise, based on the third xApp being configured to adjust the first control parameter, and the first control parameter being determined to be associated with a rollback, denying, by the device, the onboarding request of the third xApp.

Further embodiments can utilize a system, comprising at least one processor, and a memory coupled to the at least one processor and having instructions stored thereon, wherein, when executed by the at least one processor, the instructions facilitate performance of operations, comprising receiving an onboarding request from a first application (xApp), wherein the onboarding request is for access to services of a radio access network (RAN), and further determining that the onboarding request is directed to a control parameter to which rollback data has been determined to be applicable. In an embodiment, the RAN is an Open-RAN. In another embodiment, system is one of a real-time RAN intelligent controller (RIC), a near-real-time RIC, or a non-real-time RIC.

In an embodiment, the operations can further comprise extracting first information from the onboarding request, and further, comparing the first information in the onboarding request with previously stored data, wherein the previously stored data comprises a rollback event applicable to the control parameter. In an embodiment, the operations can further comprise, in response to the onboarding request being determined to be directed to the control parameter to which the rollback data has been determined to be applicable, denying the onboarding request. In another embodiment, the operations can further comprise generating warning data representative of a warning indicating that the first xApp is directed to the control parameter to which the rollback data has been determined to be applicable. In another embodiment, the operations can further comprise obtaining the rollback data from a data store, and wherein the data store further comprises multiple rollback events applicable to the control parameter.

In an embodiment, the rollback data can related to an operational conflict between a second xApp configured to adjust the control parameter and a third xApp configured to adjust the control parameter.

Further embodiments can include a computer program product stored on a non-transitory computer-readable medium and comprising machine-executable instructions, wherein when executed, the machine-executable instructions cause a machine to perform operations, comprising detecting a first state of a metric, wherein the metric relates to an operating condition of a radio access network (RAN), further detecting, according to a defined criterion, a second state of the metric, wherein the second state of the metric is at a time subsequent to the first state and is in an operationally worse state than the first state; and further identifying that the operationally worse state of the metric is as a result of operation of a first application (xApp) configured to adjust the metric and operation of a second xApp configured to adjust the metric.

In another embodiment, the operations can further comprise (i) identifying a first operational impact of the first xApp on one or more operations performed via network equipment of the RAN, (ii) identifying a second operational impact of the second xApp on the one or more operations performed via the network equipment of the RAN, (iii) in response to determining, according to a second defined criterion, that the first xApp deleteriously affects the one or more operations performed via the network equipment of the RAN to a greater extent than a deleterious effect on the one or more operations by the second xApp, terminating operation of the first xApp, and further, (iv) rolling back operation of the network equipment of the RAN to an operational state associated with a time from prior to implementation of the first xApp via the network equipment of the RAN.

In another embodiment, the operations can further comprise (i) receiving an onboarding request from a third xApp, (ii) identifying that the third xApp is configured to adjust usage of the metric, (iii) comparing a configuration of the third xApp with a configuration of the first xApp, (iv) based on a result of the comparing, determining, according to a defined similarity criterion, that the configuration of the third xApp is threshold similar to the configuration of the first xApp, and (v) in response to determining that the third xApp and the first xApp are threshold similar, denying the onboarding request from the third xApp. In another embodiment, the operations can further comprise generating and communicating a warning that the third xApp has been denied onboarding according to the onboarding request.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 12 illustrates a methodology for deploying an xApp on a RAN, in accordance with one or more embodiments described herein.

DETAILED DESCRIPTION

Figure 1:
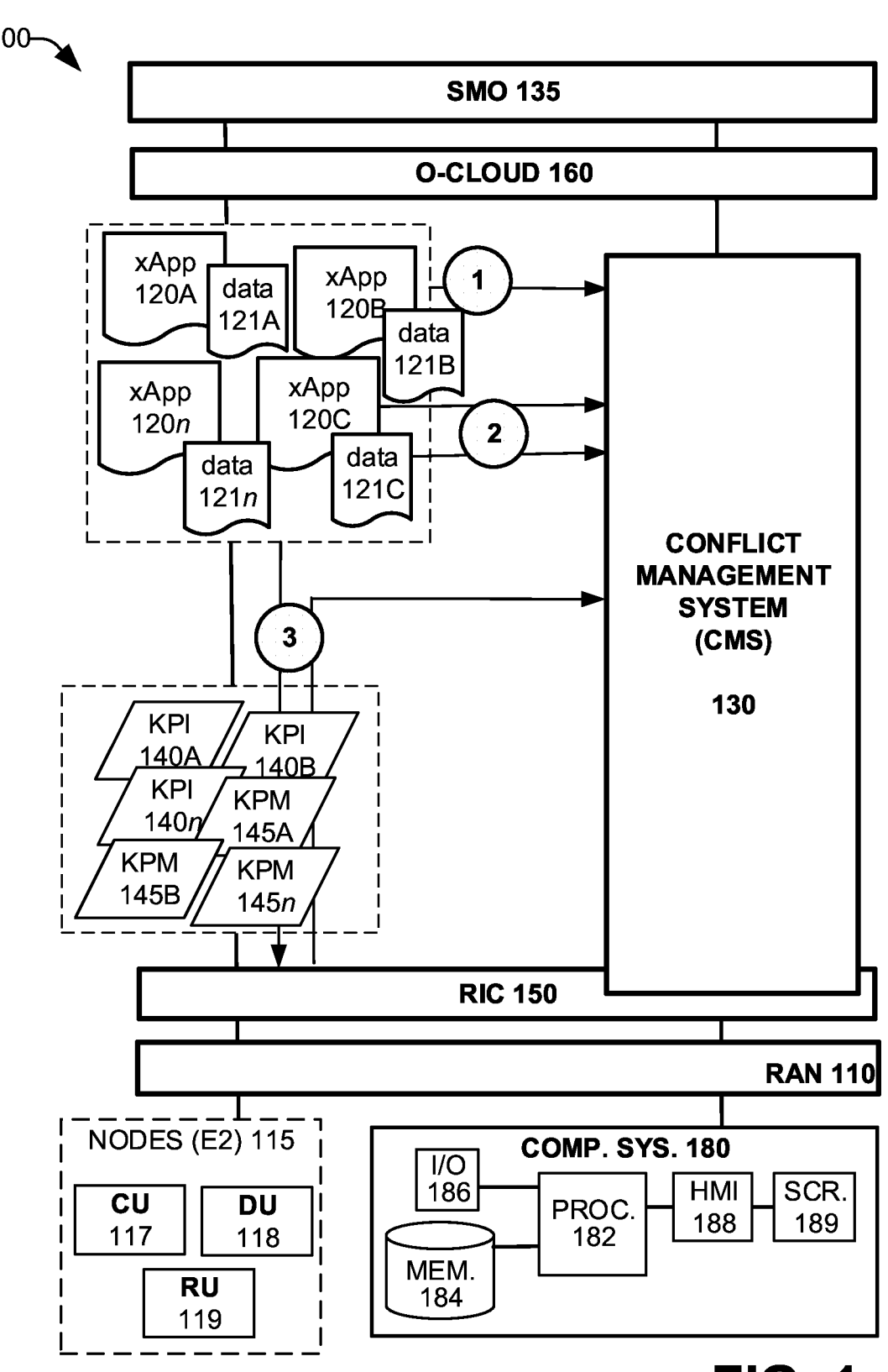
FIG. 1 presents a system comprising various components/devices and various types of interaction/analysis that can be performed regarding conflict management between various xApps deployed on a RAN, in accordance with an embodiment.

One or more embodiments are now described with reference to the drawings, wherein like reference numerals are used to refer to like elements throughout. In the following description, for purposes of explanation, numerous specific details are set forth in order to provide a thorough understanding of the various embodiments. It is to be appreciated, however, that the various embodiments can be practiced without these specific details, e.g., without applying to any particular networked environment or standard. In other instances, well-known structures and devices are shown in block diagram form in order to facilitate describing the embodiments in additional detail.

The various embodiments presented herein relate to utilizing a conflict management system (CMS) in conjunction with conflict detection and mitigation strategies. The CMS can be configured to enable implementation in any of real time (RT), near-RT, and/or non-RT. The CMS is configured to comply with O-RAN platform requirements, xApp requirements, and respective RAN intelligent controller (RIC) application programming interface (API) requirements.

Per the respective embodiments, one or more systems are presented that are configured to support multi-xApp interaction. A combination of preventive measures and reactive measures engenders co-deployment of xApps with interaction possible. Based on detected conflicts and/or predicted conflicts, xApp subscriptions/deployments at the RAN can be adjusted to avoid conflicting control actions. xApp subscription management enables operators to adjust the deployment strategy of their xApps. Further, implementation of machine learning (ML) and/or artificial intelligence (AI) based models can provide interventional commands to E2-nodes when priority assessment and subscription adjustments may not be an effective solution.

For pre-action/deployment measures, during an onboarding procedure the respective xApps can provide a descriptor that includes any of: configuration information, control (level and type of control) information, targeted key performance indicator (KPI) category and sub-category, xApp classification, and suchlike. The provided descriptors can be used by the CMS to trigger preventive measures.

For the post-action/post-onboarding measures, a RIC can act as an xApp-independent observer to detect conflicting xApps based on performance monitoring.

Per the respective systems/technologies presented herein, with a multi-xApp interaction framework, respective ML technologies can be utilized to learn/identify the "projection" of performance change. The ML can further predict KPIs in advance to establish the baseline behavior. One or more ML technologies/models can be deployed to enable correlation to be established between xApp actions and the performance change, and further determine the xApps that lead to opposite performance directions.

During an onboarding process, a restrictive framework can be utilized in which RIC restricts the selection range instead of free selection of all information open to an xApp for which onboarding is being requested. Accordingly, the RIC can specify the list of targeted KPIs for xApp to choose from based on App classifications and can also specify a list of allowed actions for xApp to choose from based on the targeted KPIs. Furthermore, per the various embodiments presented herein, dimensioning can be utilized to limit the number of xApps allowed to target the same class/KPI category.

TERMS xApp: an application deployable at an O-RAN (e.g., at the RIC) and configured to optimize/automate RAN operations in conjunction with supporting use cases directed at lowering an operator's (e.g., a mobile operator) total cost of ownership (TCO), enhancing a customer's quality of experience (QoE), and suchlike.

Class/KPI Category: respective KPIs can be separated into classes, whereby each KPI can have its own class. Each xApp (e.g., each of xApps 120A-n) can be assigned/associated with the KPI that is the operational focus of the respective xApp. Accordingly, a potential conflict regarding a KPI can be rapidly identified based on classifying a first xApp (e.g., during onboarding) to a KPI, and determining the operational effect of the first xApp on the one or more xApps that have already been classified for that particular KPI. Further, to maintain operational efficiency of the RAN and to mitigate potentially unforeseeable conflicts, the number of xApps that can be supported/implemented for a particular KPI class can be limited. The fewer the number of xApps affecting a particular KPI, the less likelihood of a conflict arising, whether foreseen or unforeseen.

Dimensioning: limiting number of xApps based on KPI classification of the respective xApp.

Key Performance Indicator (KPI): provides a quantifiable measure of performance for a particular objective. KPIs can pertain to accessibility, availability, integrity, mobility, retainability, and suchlike.

Key Performance Measure (KPM): provides a measure of performance for a KPI.

Nodes & E2 Nodes: RAN architecture can include a range of units referred to as nodes, such as central units (CUs), distributed units (DUs), and radio units (RUs). Generally, CUs centralize RAN packet processing functions, DUs conduct baseband processing functions across cell sites, and RUs provide radio functions at antenna sites. While the RUs are located at antenna sites, the locations of CUs and DUs are not fixed to any particular geographic area or site. DUs can be co-located with RUs local to an antenna, also DUs can be located many miles from RUs, whereby connection between the DUs and RUs is by any suitable technology, e.g., fiber optics. CUs and DUs can be located "in the cloud", such as at a data center which may or may not be proximal to the RU.

O-cloud: an operational layer including hardware and software components providing cloud computing capabilities to execute various RAN network functions. O-cloud functions can include O-DU, O-CU-CP, O-CU-UP, O-eNB, near-RT RIC, and non-RT RIC.

Preventative Measures: conflict management performed before a potentially adverse xApp is deployed/implemented, such that an xApp that could negatively affect operation of a RAN is prevented from being onboarded/deployed/implemented.

RAN Intelligent Controller (RIC): The RIC is an O-RAN component configured to control and optimize RAN functions. The RIC enables O-RAN disaggregation with regard to onboarding of multi-vendor/third-party xApps to automate/optimize RAN operations, e.g., with regard to use cases that lower mobile operators' TCO, enhance customers' QoE, and suchlike. The RIC can control what xApps are deployed on a RAN. For some context, example, non-limiting Non-Real Time RIC (Non-RT RIC) functions include service and policy management, RAN analytics, and model training for the near-Real Time RICs. In this regard, the Non-RT-RIC enables non-real-time (e.g., a first range of time, such as >1 s) control of RAN elements and their resources through applications, e.g., specialized applications called xApps. Example, non-limiting Near-Real Time RIC (Near-RT RIC) functions enable near-real-time optimization and control and data monitoring of CU and DU nodes in near-RT timescales (e.g., a second range of time representing less time than the first time range, such as between 10 ms and 1 s). In this regard, the Near-RT RIC controls RAN elements and their resources with optimization actions that typically take about 10 milliseconds to about one second to complete, although different time ranges can be selected. The Near-RT RIC can receive policy guidance from the Non-RT-RIC and can provide policy feedback to the Non-RT-RIC through specialized applications called xApps. In this regard, a Real Time RIC (RT RIC) is designed to handle network functions at real time timescales (e.g., a third range of time representing less time than the first time range and the second time range, such as <10 ms).

Reactive Measures: conflict management performed while multiple xApps are deployed/implemented, such that interactions between the multiple xApps and effect on respective KPIs are identified and resolved.

Rollback: returning operation of a RAN to a prior state of operation. E.g., operation of a first xApp and operation of a second xApp are determined to be in conflict. To mitigate the conflict, operation of the first xApp is terminated and whatever settings were configured by operation of the first xApp are returned to a configuration prior (e.g., a pre-conflict condition) to the first xApp was implemented.

n is any positive integer.

1. OVERVIEW

While an impetus of O-RAN is for an open, disaggregated RAN, the openness of the RAN architecture and protocols can give rise to (i) an xApp may not be supported by the RAN, (ii) various conflicts when multiple applications (xApps) are co-deployed on a RAN, and/or (iii) an xApp may adversely affect/cause a degradation in the performance of another xApp and/or RAN performance. System providers/operators may not be aware of the potential conflicts that may arise from deploying certain xApps on the same RAN site simultaneously. Conflicting xApps may cause performance degradation in the RAN and/or the RIC. A conflict can occur when a first xApp attempts to overwrite a policy or an action recently applied/configured/set by a second xApp. This overwrite scenario may cause the first xApp and the second xApp to be stuck in a state of "ping pong", wherein the first xApp is constantly overwriting second xApp's decisions/configurations (and vice versa), leading to degradation in performance in the RIC and/or the RAN.

The various embodiments presented herein are configured to observe xApp behaviors to identify/infer potential and existing conflicts between various xApps, and further manage/mitigate deleterious effects of deploying one or more conflicting xApps on a RAN and/or an RIC. When a negative relationship between xApps is identified, a warning/alert can be generated whenever a problematic combination of xApps is/may be deployed on a RAN site, to assist in avoiding direct and indirect conflicts. In an embodiment, by utilizing current or historic data regarding operation between two or more xApps, warnings/alerts can be raised to prevent a combination of xApps from being destroyed and deleteriously affecting operation of the RAN.

To provide understanding of the various embodiments presented herein, FIG. 1, system 100 presents a high-level overview of some of the systems/components of concern, and various types of interaction/analysis that can be performed regarding conflict management between various xApps deployed on a RAN.

As shown, FIG. 1 presents a RAN 110 for which respective xApps 120A-n can be configured to potentially operate and/or currently operate on. The RAN 110 can include various nodes 115, for example one or more of a CU 117, DU 118, and a RU 119. RAN 110 can be communicatively coupled to a service management orchestration (SMO) layer/component 135, wherein the SMO 135 can be configured to control configuration and automation aspects of RAN 110 and a RIC 150. The SMO 135 can be further configured to coordinate deployment of respective xApps 120A-n, which, in an example scenario, can involve the SMO 135 operating in conjunction with the RIC 150 regarding the possibility of conflict arising during deployment of respective xApps 120A-n.

The RIC 150 can be configured to control and optimize functions at RAN 110, including onboarding of xApps 120A-n to be implemented at the RAN 110. As further described, the RIC 150 can further include a conflict management system (CMS) 130 configured to identify potential and existing conflicts between various xApps 120A-n during potential and current deployment of one or more xApps 120A-n on the RAN 110. As further described, the xApps 120A-n can affect operation of various KPIs 140A-n at the RAN 110, e.g., as determined by key performance metrics KPMs 145A-n. In an ideal situation, the RAN 110 would be configured to support operation of numerous xApps 120A-n. However, deployment of a first application (e.g., xApp 120A) can affect deployment of a second application (e.g., xApp 120B) on the RAN 110, and deleteriously affect one or more of the KPIs 140A-n. As shown in FIG. 1, each xApp 120A-n can be configured with a specific property, use case, metric, etc., for which the xApps 120A-n are respectively designed, with the respective property, use case, etc., of focus for each xApp 120A-n being represented as data 121A-n, wherein respective data 121A-n is associated with a respective xApp 120A-n, e.g., xApp 120A has associated data 121A, xApp 120B has data 121B, xApp 120n has data 121n, etc.

System 100 can further include an O-cloud 160, an infrastructure layer configured to coordinate functions for the RAN 110, SMO 135, and the RIC 150.

FIG. 1 presents three high level scenarios (1) onboarding, (2) subscription/pre-deployment, (3) deployed and operational:

(1) onboarding: an xApp120A is to be deployed on the RAN 110, however, during the onboarding/subscription process (e.g., controlling an operational parameter on the RAN 110) of xApp 120A to the RAN 110, the CMS 130 can determine whether the respective one or more operations to be performed by xApp 120A are (i) supported by the RAN 110 and/or (ii) while supported may deleteriously affect operation of the RAN 110 and/or other xApps 120B-n already deployed on the RAN 110. In an event that a control parameter/target/operation of an xApp 120A is not supported by RAN 110, subscription of the xApp 120A at the RAN 110 can be denied.

(2) subscription/pre-deployment: in the event of xApp 120B can be deployed on the RAN 110, CMS 130 can be configured to determine whether one or more operational conflicts exist between xApp 120B and a deployed/to be deployed xApp 120C. In the event of CMS 130 determines an operational conflict exists between xApp 120B and xApp 120C, various responses can exist such as one of xApp 120B or xApp 120C is not deployed, the xApps are deployed with operation of xAppB prioritized over xAppC, and suchlike, as further described.

(3) deployed and operational: numerous xApp's 120A-n are deployed and operational on RAN 110, whereby the operational effect of one or more of the xApp's 120A-n can be assessed by the CMS 130. Operation of the one or more of the xApp's 120A-n can be assessed based on an impact of a respective xApp 120A-n on operation of one or more KPIs 140A-n and/or KPMs 150A-n. Accordingly, an xApp (e.g., xApp 120N) that is negatively affecting operation of one or more of the KPIs 140A-n and/or operation of any of xApp's 120A-n can be isolated, with operation terminated, delayed, postponed, etc., as further described.

As shown in FIG. 1, CMS 130 and RAN 110 can be communicatively coupled to a computer system 180. The computer system 180 can comprise a processor 182 and a memory 184, wherein the processor 182 can execute the various computer-executable components, functions, operations, etc., presented herein. The memory 184 can be utilized to store the various computer-executable components, functions, code, etc., as well as information regarding any of xApps 120A-n, KPIs 140A-n, KPMs 150A-n, operating condition information of the O-RAN (e.g., RAN 110, RIC 150, SMO 135, as further described), processes 245 (as further described), data 121A-n stored in information database 250 and subscription database 260 (as further described), thresholds, alarms/warnings/notifications, and suchlike.

As further shown, computer system 180 can include an input/output (I/O) component 186, wherein the I/O component 186 can be a transceiver configured to enable transmission/receipt of information and data between any of the components included in system 100. I/O component 186 can be communicatively coupled to the remotely located devices and systems. In an embodiment, I/O component 186 can be configured to transmit various alerts/warnings (e.g., warnings/alarms/information 236A-n) regarding conflict between xApps 120A-n.

In an embodiment, the computer system 180 can further include a human-machine interface (HMI) 188 (e.g., a display, a graphical-user interface (GUI)) which can be configured to present various information including any of xApps 120A-n, associated conflicts and resolutions, etc., per the various embodiments presented herein. The HMI 188 can include an interactive display 189 to present the various information via various screens presented thereon, and further configured to facilitate input of information/settings/etc., regarding the xApps 120A-n.

Per the respective components presented in system 100, conflict mitigation can pertain to detecting, avoiding, and/or addressing conflicting interactions between different xApps 120A-n. Deploying an xApp 120A-n on RAN 110 may involve changing one or more operational parameters at the RAN 110 (or at SMO 135, RIC 150, etc., as further described) with an objective of optimizing a specific metric (e.g., having an associated KPI 140A-n). However, while two or more xApps 120A-n (e.g., a first xApp 120A and a second xApp 120B) may be respectively designed to optimize the same metric, co-deploying the two or more xApps 120A-n may result in conflicting actions. In another scenario, while a first operational objective of xApp 120A and a second operational objective of xApp 120B may be different, co-deploying xApp 120A with xApp 120B may result in conflicting actions that also may adversely affect operation of the RAN 110. Hence, conflict management and resolution are of concern when two or more xApps 120A-n are deployed, particularly where the respective xApps 120A-n are created by different vendors, which can be likely given the disaggregated nature of O-RAN systems.

Per the O-RAN environment presented in FIG. 1, the xApps 120A-n can respectively interact with any of the SMO platform 135, RIC 150 (e.g., controlling interface exposure), and O-cloud 160 components. It is to be appreciated that, to minimize repetition, while the various embodiments presented herein may specifically mention one or more xApps 120A-n being presented/deployed/implemented on RAN 110, RIC 150, etc., given that the ubiquitous nature of xApps 120A-n being able to be implemented on RAN 110, SMO 135, RIC 150, etc., mention of utilization of an xApp 120A-n on any of RAN 110, SMO 135, RIC 150, o-cloud 160, etc., equally applies to application on any of the respective components described herein.

The various embodiments presented herein can be utilized for RT, near-RT, and/or non-RT implementation of RICs, e.g., as present in a conventional RAN architecture. In conventional systems, implementation solutions to address conflicts between xApps 120A-n are not available in near-RT or RT, which the various embodiments presented herein address. The various embodiments presented herein provide a management architecture utilizing the CMS 130 to identify and resolve conflict issues as a function of one or more operational requirements of the RAN 110, operational requirements of respective xApps 120A-n, RIC 150 API requirements, vendor agnostic approaches, and suchlike.

1.1. Conflicts Overview

The following provides an overview of some of the conflicts that may be present between various xApps 120A-n deployed on a RAN 110. As mentioned, respective xApps 120A-n can configure a single parameter or a set of parameters to optimize a specific metric (e.g., a KPI 140A-n) at the RAN 110. Each xApps 120A-n can have a specific control target (e.g., target 212A, per FIG. 2). For example, the control target (e.g., target 212A, per FIG. 2) of two or more xApps 120A-n deployed as part of a radio resource management (RRM) application can be a cell, a user equipment (UE), a bearer, and suchlike. Further, the control content of RRM can include access control, bearer control, handover control, resource allocation, quality of service (QoS) control, and suchlike. Furthermore, the control command can have a control time span which indicates the valid control duration. Hence, at any time, a conflict can exist between the control command of the respective xApps 120A-n, e.g., as they pertain to RRM.

As further described, respective conflicts can be categorized as follows:

1.1.A. Direct Conflicts

A direct conflict can occur between multiple xApps 120A-n, and can be directly observed by CMS 130. The following presents examples of direct conflicts:

i) one or more parameters of control target (e.g., target 212A, per FIG. 2) receive different setting requests through two or more xApps 120A-n. The CMS 130 can be configured to process the respective requests and decides which to implement based on priority and/or other metrics.

ii) a configuration may be currently implemented (e.g., a previous request has been implemented and an operation is running). A new request from a first xApp (e.g., xApp 120F) may conflict with the previous request from the same xApp (e.g., xApp 120F) or a different xApp (e.g., xApp 120G). Hence, a conflict can be engendered as a function of an addition of a new request in view of a prior request.

iii) the total requested resources from different xApps 120A-n may exceed the limitation of RAN 110—supported resources.

As further described, mitigation of a direct conflict can be achieved by pre-action coordination by CMS 130. Accordingly, the CMS 130 can implement a specific change and/or a sequence of applied changes to prevent a conflict arising between respective xApps 120A-n.

1.1.b. Indirect Conflicts

Conflicts between multiple xApps 120A-n may not be able to be observed directly. However, some dependencies among the target parameters (e.g., target 212A, per FIG. 2) and resources of different xApps 120A-n can be observed. As further described, CMS 130 can be configured to predict potential conflicts and operate to avoid and/or mitigate a conflict. An example of indirect conflict is where different xApps 120A-n target different parameters to optimize the same metric based on the respective objective of the respective xApps 120A-n. Such a situation may not result in conflicting parameter settings but configuration of a first xApp 120P may impact the system metric (e.g., a target 212A, a KPI 140A, a KPM 145A) which can be equivalent to a parameter change targeted by another xApp 120Q. For example, antenna tilts and cell Individual offset (CIO) are two distinct control actions, wherein an antenna tilt configuration (e.g., target 212A, FIG. 2) is targeted by xApp 120P while cell individual offset (CIO) (e.g., target 212B, FIG. 2) is targeted by xApp 120Q, but both control actions can impact handover function(s).

As further described, mitigation of indirect conflicts can be achieved by post-action verifications. In an example scenario, changes are applied by respective xApps 120A-n, and the target metrics (e.g., KPIs 140A-n) are observed. As further described, mitigation of indirect conflicts can be achieved by post-action verifications. In an example scenario, changes are applied by respective xApps 120A-n, and the target metrics (e.g., KPIs 140A-n) are observed. Based on the observed metrics, CMS 130 can make responsive corrections, such as rolling back a control action(s)/control parameter, wherein rolling back relates to returning operation of the RAN 110 to a state prior to when the conflict was detected and/or the conflicting xApp (e.g., xApp 120A) was implemented/deployed.

1.1.c. Implicit Conflicts

Such conflicts are not directly visible, and further, the dependencies between multiple xApps 120A-n cannot be directly observed. Essentially, different xApps 120A-n optimize different metrics with different parameters. In such a situation, optimization of a first metric may adversely affect other metrics optimized by other xApps 120A-n. For example, throughput metrics for guaranteed bit rate (GBR) users may degrade metrics of non-GBR users or overall cell throughput.

As further described, mitigation (e.g., by the CMS 130) of implicit conflicts may not be achievable via analytical modeling prior to deploying an xApp 120A-n because operational dependencies between two or more xApps 120A-n can be difficult to predict/observe. Accordingly, AI and ML based coordination schemes (e.g., per implementation of processes 245, as further described) can be utilized at the CMS 130 to identify inter-application dependencies between the two or more xApps 120A-n. In an embodiment, a conflict detection scheme can be provided (e.g., by CMS 130) based on, for example, end-to-end (E2E) system performance and network intent, a specific use case, and suchlike.

In an embodiment, a goal of each xApp 120A-n can be configured prior to providing optimization modelling. However, defining the utility metrics can assist review of an xApps 120A-n in a conflict coordination phase. The utility metrics can include the importance of both targeted metrics and the use case to which the xApps 120A-n pertains. In an embodiment, the CMS 130 can employ various ML-based approaches (e.g., in processes 245, as further described) to pre-assess proposed changes to an xApps 120A-n and/or the operating environment to which the xApps 120A-n is going to be implemented to estimate the probability of degrading a metric/set of metrics versus the intended improvement to the metric/set of metrics.

It is to be appreciated that while the respective systems, technologies, methods, etc., are presented as providing solutions for RIC 150 conflict management at the near-RT, the systems, etc., equally pertain to other RIC layers (e.g., RT, non-RT). As mentioned, respective xApps 120A-n can provide control/optimization functions to the underlying RAN 110, and accordingly, may be required to avoid contradictory actions when multiple xApps 120A-n are deployed/operational. In an embodiment, the CMS 130 can be designed to accommodate independent xApp 120A-n designs, wherein CMS 130 is vendor agnostic. Per the embodiments presented herein, complexity of conflict management is not limited to independence of different xApps 120A-n. Given the open architecture nature of O-RAN, it is not possible to predict which xApps 120A-n will be deployed together and further, RIC 150 may not know the respective design of each xApp 120A-n. Accordingly, in an embodiment, the CMS 130 can be utilized in a multi-xApps 120A-n interaction framework, as presented in FIG. 2 below.

2. PREVENTATIVE MEASURES AND REACTIVE MEASURES

Per the foregoing regarding the issues of unpredictable interaction between xApps 120A-n, respective deployment of xApps 120A-n, the open architecture structure of the RAN 110, etc., the various embodiments presented herein can utilize a combination of preventive (pre-action) measures and reactive (post-action) measures.

2.1. PREVENTIVE measures can be applied to avoid enabling/deploying two or more xApps 120A-n having a direct conflict or overlapping functionality that could deleteriously affect operation of the respective xApps 120A-n, RAN 110, etc. Based on information generated at this stage, preventative measures enable operators to determine a pre-deployment strategy for their respective xApps 120A-n.

2.2. REACTIVE measures can be implemented to detect xApps 120A-n having conflicting decisions, whereby co-deployment leads to changes in KPIs 140A-n by a first xApp (e.g., xApp 120A) and a second xApp (e.g., xApp 120B) that may be opposite, antonymous, incompatible, in nature.

By utilizing preventative measures and/or reactive measures, operators of the xApps 120A-n can be notified (e.g., via HMI 188, warnings 236A-n) of the respective xApp 120A-n interactions (whether in conflict, complimentary, etc.) in conjunction with any recommendations (e.g., ML/AI derived) generated by one or more components (e.g., onboarding component 210, subscription management component 220, conflict detection component 240, conflict management component 230, and suchlike) presented in the respective embodiments herein. Further, post action verifications (e.g., generated by CMS 130) regarding interaction between two or more deployed and operational xApps 120A-n enables operators to adjust a deployment strategy comprising the respective xApps 120A-n.

3. CONFLICT MANAGEMENT SYSTEM

Figure 2:
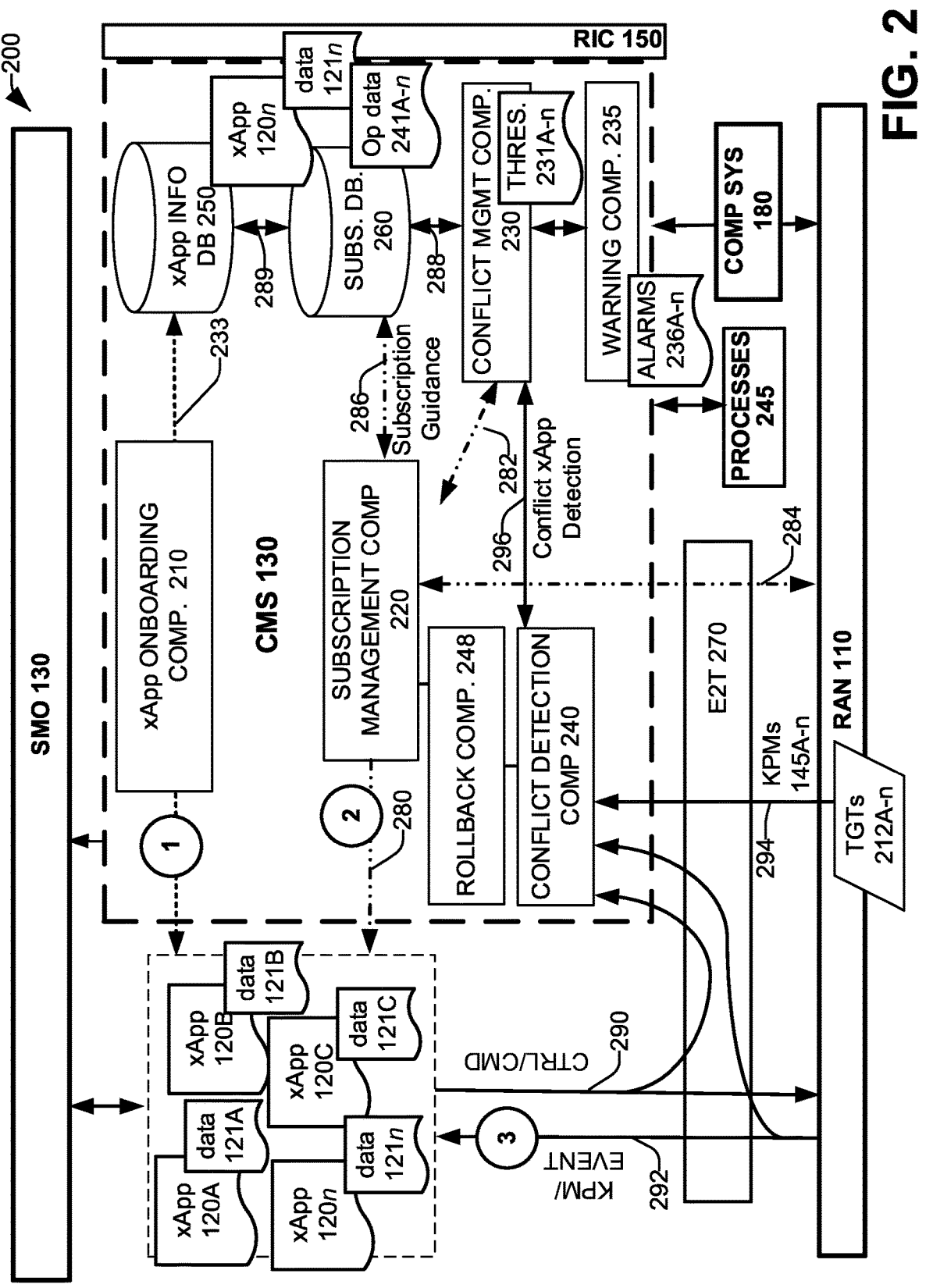
FIG. 2 illustrates a system comprising xApp conflict management architecture, in accordance with an embodiment.

FIG. 2, system 200, illustrates an xApp conflict management architecture, in accordance with an embodiment. As shown, a collection of xApps 120A-n is to be deployed and/or are currently deployed on RAN 110. A CMS 130 can be included in system 200, with CMS 130 being configured to identify and/or resolve any conflicts between xApps 120A-n. The CMS 130 can include an onboarding component 210 communicatively coupled to an xApp information database 250 and a subscription database 260 (e.g., where databases 250 and 260 can be included in memory 184). In another embodiment, CMS 130 can further include a subscription management component 220 coupled to the subscription database 260 and further coupled to a conflict management component 230. As shown in FIG. 2, the subscription management component 220 can be configured to interact with the xApps 120A-n. In a further embodiment, a conflict detection component 240 can be connected to the conflict management component 230, and further connected to any of the RAN 110, E2 Terminal (E2T) 270, and further monitors/interacts with xApps 120A-n.

As further described herein (e.g., per FIGS. 4-8), the conflict detection component 240 can be configured with various ML and AI technologies (e.g., FIG. 4, processes 245) to enable detection of conflicts arising from multiple deployed xApps 120A-n. As shown in FIG. 2, information database 250 and subscription database 260 can be respectively connected via connector 289, and subscription database 260 can be connected via connector 288 to the conflict management component 230, such that information regarding xApps 120A-n can be freely shared therebetween. As mentioned, information database 250 and subscription database 260 can be configured to store information (e.g., data 121A-n) previously obtained from previously onboarded/onboard requested xApps 120A-n, wherein the stored data 121A-n can function as historical data against which data (e.g., data 121A) for a current xApp (e.g., xApp 120A) can be compared with. In an embodiment, while shown at conflict management component 230, any of the sub-components of CMS 130 can utilize threshold relationships 231A-n or other defined criterion regarding determined likelihood (e.g., likely, not likely, similarity of xApps, etc.) of conflict between any of xApps 120A-n. CMS 130 can further include a warning component 235 configured to generate and transmit warnings/alerts/notifications 236A-n regarding implementation, denied onboarding, etc., of xApps 120A-n.

In another embodiment, CMS 130 can further include a rollback component 248, wherein the rollback component 248 can be configured to monitor operation of the RAN 110 (and/or nodes 115, etc.), and if required, can rollback (reset) operation of the RAN 110 to an operational condition prior to an xApp (e.g., first xApp 120A) being implemented. The rollback component 248 can be configured to communicate with any of the components in CMS 130, as well as with nodes 115, SMO 130, E2T 270, RIC 150, xApps 120A-n, etc., to enable the rollback component 248 to acquire operational data 241A-n regarding operation of any device, component, etc., across the communication system presented herein. The operational data 241A-n can be stored in databases 250 and 260, and can include operational data/settings regarding any of xApps 120A-n, the data 121A-n, targets 212A-n, thresholds 231A-n, KPIs 140A-n, KPMs 150A-n, and suchlike.

Accordingly, in the event of the xApp 120A has operational conflict with one or more other xApps 120B-n, operation of xApp 120A can be terminated with the RAN 110 being returned to a prior operating condition that is un-influenced by operation of xApp 120A. In an embodiment, any of the components included in CMS 130 can monitor operation of the RAN 110 and store data, e.g., as operational data 241A-n, regarding the respective operating conditions implemented at any given time, e.g., operational data 241A for T1 (a first moment in time)=operating condition of RAN 110 before a first xApp 120A was implemented on the RAN 110, operational data 241B for T2 (a second moment in time)=operating condition of RAN 110 after first xApp 120A was implemented on the RAN 110, operational data 241C for T3 (a third moment in time)=operating condition of RAN 110 when first xApp 120A conflicts with second xApp 120B implemented on the RAN 110, operational data 241D for T4 (a fourth moment in time)=operating condition of RAN 110 when a metric is affected by first xApp 120A and/or second xApp 120B implemented on the RAN 110, operational data 241E for T5 (a fifth moment in time)=operating condition of RAN 110 when operation of first xApp 120A is terminated on the RAN 110, and suchlike. Hence, as a function of terminating operation of an xApp 120A-n, the operating condition of RAN 110, etc., can be returned to prior operational state by the rollback component 248.

Interaction and operation of respective components are represented by steps operations (1)-(3), as further described.

At (1), via connection 233, one or xApps 120A-n are being submitted for onboarding/implementation on the RAN 110. In an example embodiment, the onboarding component 210 can be configured to receive an xApp 120A (e.g., a first xApp), wherein it is desired to have the xApp 120A-n deployed on the RAN 110. The onboarding component 210 can be configured to review the xApp 120A-n to determine one or more features (e.g., operational features, e.g., in data 121A) of the xApp 120A. The onboarding component 210 can be further configured to compare the one or more features of the xApp 120A with information (e.g., data 121B-n) stored in the xApp information database 250 to determine whether the one or more features of the xApp 120A can be supported by the RAN 110. In an embodiment, in response to a determination that the one or more features of the xApp 120A can be supported by the RAN 110, the onboarding component 210 can be configured to approve onboarding of the xApp 120A, for subsequent deployment of the xApp 120A. In another embodiment, in response to a determination that the one or more features of the xApp 120A cannot be supported by the RAN 110, the onboarding component 210 can be configured to deny onboarding of the xApp 120A.

At (2), prior to deploying a first xApp, e.g., xApp 120A, the first xApp can be reviewed with regard to any potential negative interaction with other xApps 120A-n that may be deployed on RAN 110. As shown, the subscription management component 220 can be configured to interact with xApps 120A-n (e.g., per connection 280), the conflict management component 230 (e.g., via the subscription guidance connection 282), the RAN 110/E2T 370 (e.g., per connection 284), and/or the subscription database 260 (e.g., via connection 286). Prior to deploying an xApp 120A, the respective features (e.g., data 121A) of xApp 120A can be compared with respective features (e.g., data 121B-n) of xApps 120B-n stored in subscription database 260, wherein the xApps 120B-n may be currently deployed or previously deployed on RAN 110. The respective actions/determinations can be conveyed in warnings/alarms 236A-n.

At (3), here respective xApps 120A-n have been deployed, whereby the conflict detection component 240 can be configured to monitor and assess operation of the xApps 120A-n regarding one or more interactions between the respective xApps 120A-n, and further, operational effects of the respective xApps 120A-n on the system components such as RAN 110. In an embodiment, the conflict detection component 240 can monitor interaction(s) between the xApps 120A-n, the RAN 110, and E2T 270, as shown by control/command (CTRL/CMD) connection 290. Further, interaction originating at the RAN 110 (and E2T 270) with the xApp 120-n can be monitored by the conflict detection component 240, as shown by KPM/EVENT connector 292. Further, KPM's 145A-n can be received at the conflict detection component 240 from the RAN 110 (and E2T 370), as shown by KPM connector 294. The conflict detection component 240 can interact with the conflict management component 230, per the conflict xAppn detection connection 296. The respective actions/determinations can be conveyed in warnings/alarms 236A-n.

4. CO-DEPLOYMENT AND APPLICATION PRIORITY

In an embodiment, the conflict management component 230 can be configured to control interaction of one or more xApps 120A-n with a component/parameter. In an embodiment, the conflict management component 230 can be configured to determine that a first xApp 120A interacts with a component/parameter (e.g., target 212A) and, further, a second xApp 120B also interacts with the same component/parameter. The conflict management component 230 can be configured to utilize an Application Priority feature. In an embodiment, a first priority setting (e.g., in data 121A) can be applied to the first xApp 120A and a second priority setting (e.g., in data 121B) can be applied xApp 120B. In an embodiment, the priority setting can be configured (e.g., as a utility metric) as part of programming of an xApp 120A-n, a deployment setting configured and applied to the xApp 120A-n at the time of deployment, and suchlike. Accordingly, the conflict management component 230 can be configured to, upon receipt of first xApp 120A having a high priority metric and second xApp 120B having a low priority metric, when high priority xApp 120A issues a command, low priority xApp 120B is blocked from issuing a command(s) within a certain time interval, for example.

The conflict management component 230 can also be configured to adjust xApp 120A-n subscriptions to avoid conflicting control actions being implemented by respective xApps 120A-n. The co-deployment rules are not limited to priority assessment, and subscription adjustments and ML based models (e.g., in process 245 in conflict detection component 240) can be trained to provide interventional commands to E2-nodes (e.g., in E2T 270), e.g., CU 117, DU 118, RU 119, etc.

5. PREVENTATIVE MEASURES—EXAMPLES

Preventive measures avoid enabling xApps 120A-n having direct conflict or overlapped functionality. Preventative measures allow operators to determine the deployment strategy among such xApps 120A-n. In a conventional O-RAN system, xApp 120A-n specific implementation solutions may not be available to RIC 150 and/or the conflict management component 230. Per the various embodiments presented herein, application of preventative measures can involve defining (e.g., to RIC 150) a set of criteria to gain a high-level understanding of one or more functions of an xApp 120A-n.

5.1. Criteria

The criteria can include, in a non-limiting list:

App classification: includes but not limited to use cases defined by O-RAN.

Targeted KPI category and sub-category: the KPI 140A-n categories include coverage, capacity, energy, and suchlike. The KPIs 140A-n related to coverage can include features such as accessibility, retainability, mobility, etc.

a) accessibility KPI—tracks whether a user can access a requested service and the available quality of service.

b) retainability KPI—measures if the network can maintain the network service promised to users, e.g., call drop rates, service call drop rates.

c) mobility KPI—measures the performance of the network during the movement of users throughout the network, e.g., handover success.

Capacity related KPIs 140A-n can include number of users, number of data radio bearers (DRB), spectral efficiency, channel utilization, etc. Further, the energy related KPIs 140A-n can include power saving, transmission reception points (TRP) power, distributed unit/centralized unit (DU/CU) power consumption, etc.

Level of control: for each xApp 120A-n, the level of control can be categorized to user-level action and/or aggregate (e.g., cluster, site, sector, cell, slice, etc.)—level configuration.

Type of control: this criterion includes a RAN 110 control (RC) action list, RAN 110 parameter list, and suchlike.

The foregoing criteria can be provided by an xApp 120A-n to the RIC 150, e.g., during an onboarding procedure (e.g., as data 121A at onboarding component 210). The criteria provided by the xApp 120A-n can be utilized by the conflict management component 230 to initiate rule-based conflict mitigation strategies (e.g., priority assessment based on utility metric, subscription adjustment, and suchlike, as described herein). A non-limiting list of example conflict mitigation strategies is further provided in 8.3. CONFLICT MANAGEMENT, below.

6. REACTIVE MEASURES—EXAMPLES & OPERATION

As mentioned, owing to the potential complexity of interaction between deployed xApps 120A-n, post-action verifications may require targeted ML and AI solutions (e.g., implemented at the conflict detection component 240, via processes 245, as further described) to identify indirect and implicit conflicts. In an embodiment, conflicts between xApps 120A-n may be detected at the RIC 150, e.g., as a function of performance observations (e.g., KPI's 140A-n).

To access observations at the RIC 150, the CMS 130 can be configured to monitor the RAN 110 performance, enabling RIC 150 to act as an "xApp-independent" observer on the xApp 120A-n results. RIC 150 can be configured to determine when a change in KPI 140A-n results from an adverse effect resulting from xApps 120A-n and when the change results from a natural shift in performance of the RAN 110 that is not related to xApps 120A-n. For example, when traffic at the RAN 110 changes, changes in KPIs 140A-n can naturally result/migrate from current RAN 110 control algorithms, accordingly, such natural changes should be identified and understood to establish a change in the baseline behavior of the RAN 110.

Figure 3:
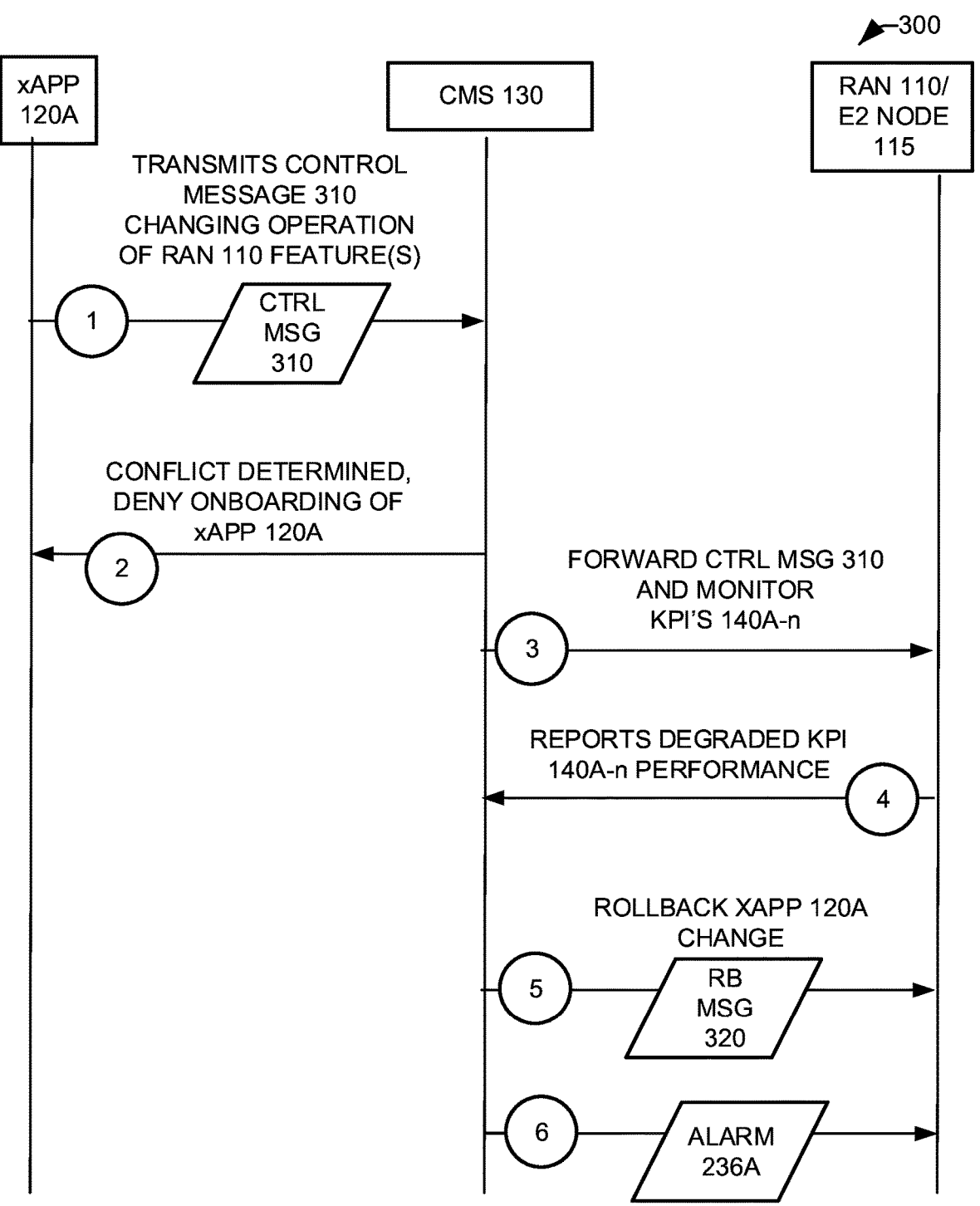
FIG. 3 presents a process illustrating respective stages in determining an xApp conflict and rollback are presented, in accordance with one or more embodiments.

Turning to FIG. 3, process diagram 300, respective stages in determining an xApp conflict and rollback are presented, in accordance with one or more embodiments. In an embodiment, the example scenario represents operation of an xApp 120A-n that has been deployed for operation on a RAN 110 (e.g., FIG. 1, scenarios (2) and (3), FIG. 2, scenarios (2) and (3)).

At FIG. 3 (1), a first xApp 120A can generate a control message 310, wherein the control message 310 is configured with command/data (e.g., data 121A) to change one or more operational parameters (e.g., KPIs 140A-n) at the RAN 110.

At FIG. 3 (2), the CMS 130 can review the respective features at RAN 110 that xApp 120A is configured to change (e.g., in data 121A). Based on a comparison with operational data (e.g., in data 121B-n) stored in the xApp information database 250 regarding currently operating/and prior implemented xApps 120B-n, the xApp onboarding component 210 can determine whether xApp 120A will generate a conflict. In the event of determining that a conflict can occur, onboarding of xApp 120A can be denied by the xApp onboarding component 210. Alternatively, in the event of the xApp onboarding component 210 does not detect any conflicts (e.g., direct or indirect), the xApp 120A can be onboarded/implemented on the RAN 110.

At FIG. 3 (3), The CMS 130 can forward the control message 310 to a component(s) to which the control message 310 pertains, e.g., at RAN 110, at E2 nodes 115 (e.g., DU 118). The CMS 130 can be further configured to monitor operation of the component(s) to which the control message 310 pertains, e.g., at RAN 110, at E2 nodes 115 (e.g., DU 118), via one or more KPIs 140A-n/KPMs 140A-n.

At FIG. 3 (4), in an example scenario, the E2 node 115 can report a current status of the E2 node 115 via a current status of the one or more KPIs 140A-n (e.g., FIG. 2, RAN 110 to conflict detection component 240, via connection 294). The CMS 130 (e.g., conflict detection component 240) can be configured to receive the KPIs 140A-n. In an embodiment, the KPI 140A can indicate that the operation of the KPI 140A has deteriorated (e.g., a threshold degradation 231A-n has been triggered, e.g., versus data 121B-n and/or prior measured KPIs 140A-n/KPMs 150A-n) stored in database 260, indicating that a conflict has occurred between operation of xApp 120A and at least one other xApp 120B-n operating on the RAN 110. In another embodiment, the operational degradation can occur at one or more components of the RAN 110, with KPIs 140A-n/KPMs 150A-n reflecting current and/or prior operation of the RAN 110.

At FIG. 3 (5), based on the conflict being determined between xApp 120A and at least one other xApp 120B-n operating on RAN 110, conflict management component 230 can be configured to issue a rollback command 320 instructing any of (a) operation of xApp 120A to be terminated, and further, (b) to rollback operation of the RAN 110 to an operating condition (e.g., pre-implementation of xApp 120A) where the KPIs 140A-n were operating as anticipated, e.g., RAN 110 and/or E2 nodes 115 were not in a degraded operation. The rollback component 248 can be configured to receive the rollback command 320 and return the RAN 110, etc., to a prior operating condition, e.g., wherein the rollback component 248 can be configured to review the operational data 241A-n to identify a prior operating condition, as previously described.

At FIG. 3 (6), the conflict management component 230 can be further configured to generate an alarm 236A detailing the current circumstances, e.g., operation of xApp 120A has been terminated in conjunction of operation of the RAN 110 being rolled back to a prior operational state. The alarm 236A can be transmitted via I/O 186 to an external system, as well as utilized to update operational data in xApp info database 250 and/or subscription database 260.

Figure 4:
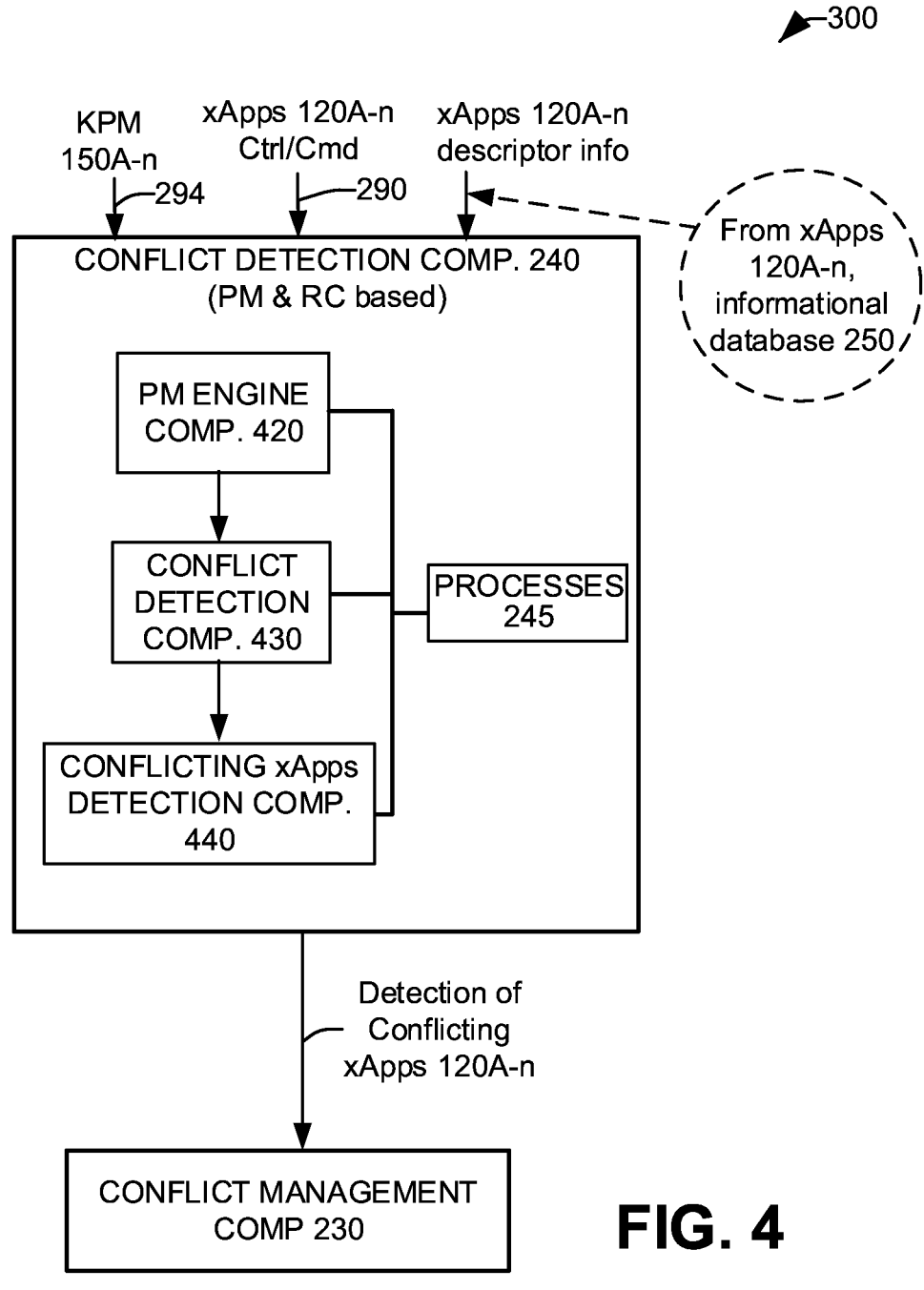
FIG. 4 presents an xApp conflict management system, in accordance with an embodiment.

As shown in FIG. 4, system 400 presents an xApp conflict management system, in accordance with an embodiment. System 400 can include a conflict detection component 240 comprising a performance management (PM) engine component 420 communicatively coupled to a conflict detection subcomponent 430, which is further communicatively coupled to a conflicting xApps detection component 440. Inputs to the conflict detection component 240 can include KPIs 140A-n and KPMs 150A-n (e.g., per FIG. 2, connector 294), xApps 120A-n CRTL/CMDs (e.g., per FIG. 2, connector 290), and xApps 120A-n descriptor information (e.g., as data 121A-n extracted directly from xApps 120A-n and/or from xApps 120A data in informational database 250). The conflict detection component 240 can further include processes 245 which can be utilized by any the PM engine component 420, conflict detection subcomponent 430, and conflicting xApps detection component 440, (as well as any components in CMS 130). Processes 245 can include any of operations, functions, workflows, etc., as well as ML and AI techniques/technologies configured to detect xApp 120A-n conflicts. Based on the respective inputs into conflict detection component 240, and operation of the PM engine component 420, conflict detection subcomponent 430, and conflicting xApps detection component 440, the conflict detection component 240 can generate one or more detected instances of conflicting xApps 120A-n, as well as any naturally occurring changes in the operation of RAN 110.

Processes 245 can include one or more Recurrent Neural Network (RNN) models which can be utilized to determine whether a change in a KPI 140A-n results from a conflict between multi-xApps 120A-n, or arises as a function of a change (e.g., natural change) in the operational environment of RAN 110 that is independent of interactions between multi-xApps 120A-n. RNN models in processes 245 can also be utilized to forecast a change in performance of a KPI 140A-n, as part of conflict detection by conflict detection component 240. The RIC 150 can be configured to establish correlations between xApp 120A-n actions and change in operational performance of the RAN 110. When multiple xApps 120A-n are working on the same target (e.g., target 212A, per FIG. 2), a prediction of impact on KPIs 140A-n can be a highly complex endeavor, with prediction suitable for implementation of one or more ML techniques in processes 245.

Based on the estimated correlation between xApps 120A-n actions and the performance change of the RAN 110, RIC 150 can identify the xApps 120A-n causing opposite performance direction. To train appropriate ML solutions in processes 245 to detect conflicting applications, xApp 120A-n, classification information can be sourced from the aforementioned inputs: KPIs 140A-n and KPMs 150A-n, xApps 120A-n CRTL/CMDs, xApps 120A-n descriptor information (e.g., data 121A-n), and suchlike.

7. CONFLICT MANAGEMENT—EXAMPLES & OPERATION

Conflict management relates to both preventive measures and reactive measures. Primary aspects of both preventive and reactive measures are conflict prediction and conflict detection, respectively. In the preventive measures sections 2.1 and 5, various example rule-based conflict management solutions were presented, wherein the conflict management solutions can be performed after conflicting xApps 120A-n have been detected. Two categories of solutions, Rule-based conflict mitigation and ML-based conflict mitigation (e.g., with processes 245), are further presented and may be used as preventive measures and/or reactive measures.

7.1. Rule-based conflict mitigation strategy can be utilized for situations where xApp 120A-n subscription adjustment can resolve a conflict issue without degrading the performance (e.g., of a KPI 140A-n).

An example rule-based conflict mitigation strategy can be expressed as the following sequence of acts/steps:

1. Trigger specific deployment strategy for conflicting xApps 120A-n;
2. Provide recommendation to adjust the xApps 120A-n;
3. Adjust xApp 120A-n subscriptions to avoid conflicting control actions/subscription guidance; and
4. Specify xApp 120A-n priority among conflicting applications.

7.2. ML based conflict mitigation strategy can be complex and may require complex interaction by processes 245. These methods can be used in situations/cases where blocking or limiting a specific xApp 120A-n could degrade performance of RAN 110 and/or the KPIs 140A-n. With ML-based conflict mitigation strategy, conflict mitigation rules are not limited to priority assessment and subscription adjustments, whereby ML based models (e.g., processes 245) can be trained to provide interventional commands to E2-nodes 115.

8. EXAMPLE EMBODIMENTS

8.1. Preventative Measures

The following provides an example onboarding procedure of xApps 120A-n. The following procedure can mitigate chance of a direct conflict(s) between an onboarding xApps 120A-n and currently subscribed xApps 120A-n. The respective xApp 120A-n can provide various information/criteria (e.g., as described in Sec. 5.1.) during an onboarding procedure (e.g., to the RIC 150) of the xApp 120A-n with the RAN 110.

The information (e.g., data 121A-n) provided by an xApp 120A-n (e.g., extracted by onboarding component 210) can be compared with current xApp 120A-n subscriptions (e.g., in the subscription database 260 and/or the xApp information database 250) to ensure consistency of operation, and any xApps 120A-n subscription requests which are inconsistent with the current xApps 120A-n can be rejected. The subscription database 260 can include the information structure (e.g., in data 121A-n) of xApps 120A-n deployed on the RAN 110. As a first xApp (e.g., xApp 120A and data 121A) is presented for subscription, the information (e.g., data 121B-n) stored in the subscription database 260 regarding the deployed xApps 120B-n can be used as a reference (e.g., by subscription management component 220, conflict management component 230) to check the consistency of information provided by the first xApp, xApp 120A. In the event of a determination (e.g., by subscription management component 220, conflict management component 230) that the already deployed xApps 120A-n can support implementation of xApp 120A, xApp 120A can be subscribed. In the event of a determination (e.g., by subscription management component 220, conflict management component 230) that the already deployed xApps 120A-n do not support/may have a conflict with implementing xApp 120A, subscription/implementation of the xApp 120A on RAN 110 can be denied (e.g., by the onboarding component 210 or the conflict management component 230). By utilizing information (e.g., historic data 121A-n) already known regarding the deployed xApps 120B-n to check the information/ requirement(s) of xApp 120A enables an expeditious review of xApp 120A, which enables the various embodiments presented herein to be applicable to RT and near-RT implementation at RIC 150.

RIC 150 APIs can be used by the xApp 120A-n to access the Information Elements (EIs) of associated E2SMs (E2 Service Models). The RIC 150 provides decoupled APIs from specific implementation solutions. Further, xApps 120A-n can provide the descriptor (e.g., in any of data 121A-n) that includes configuration, control (level and type of control), targeted KPI 140A-n category and sub-category, and xApp classification. The descriptor data provides the necessary data to enable management of the xApp 120A-n including subscription management, conflict management, and orchestration, e.g., based on comparing operational data (e.g., data 121A) of a first xApp (e.g., xApp 120A) with (i) operational data (e.g., data 121B) of a second xApp (e.g., xApp 120B) that was previously or is currently deployed, or (ii) with operational data (e.g., data 121B-n) of multiple xApps (e.g., xApp 120B-n) that were previously or are currently deployed.

The proposed embodiments enable dimensioning, which limits the number of xApps 120A-n allowed to target the same class/KPI 140A-n category. Use of dimensioning reduces the likelihood of untreated conflicts due to co-deployment of xApps 120A-n.

To mitigate potential conflicts, a restrictive framework can be utilized by onboarding component 210 and/or subscription management component 220, whereby onboarding component 210 and/or subscription management component 220 restricts the selection range instead of free selection of all information open to xApps 120A-n. With a restrictive framework approach, onboarding component 210 and/or subscription management component 220 can specify a list of targeted KPIs 140A-n for xApps 120A-n to choose based on xApp 120A-n classifications and it also specifies a list of allowed actions for xApps 120A-n to choose based on the targeted KPIs 140A-n.

8.2. Reactive Measures

The following presents further description of structure and operation of the conflict detection component 240. The conflict detection component 240 can be utilized in enabling reactive measures. In an embodiment, to enact reactive measures, firstly the conflicting xApps 120A-n are identified, with the conflict detection component 240 and/or conflict management component 230 subsequently implementing various rule based and ML based conflict mitigation strategies, as previously mentioned in Sec. 7.

Figure 5:
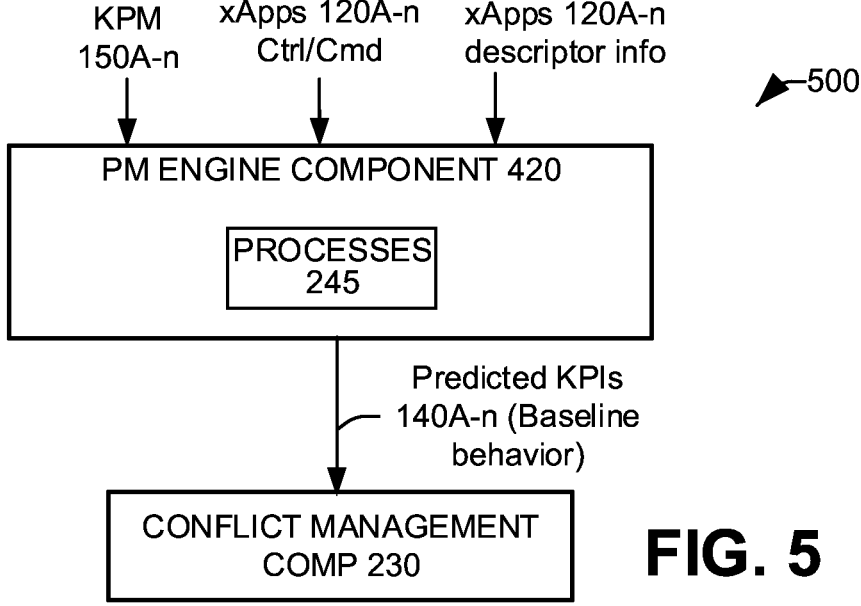
FIG. 5 presents a system comprising an PM Engine component, in accordance with an embodiment.

As previously mentioned, per FIG. 4, the conflict detection component 240 can include a PM engine component 420 for performance change projection, to enable conflict based on the observed KPI 140A-n and predicted KPI 140A-n (e.g., as KPMs 150A-n) at the conflict detection component 240 to identify the xApps 120A-n leading to opposite performance. FIG. 5, system 500, provides a structural framework of PM Engine component 420. The PM engine component 420 can be configured to utilize processes 245 to predict the KPIs 140A-n in advance using previous KPMs 150A-n, enforced xApps 120A-n control commands, and xApps 120A-n descriptor information (e.g., in data 121A-n) including the proposed criteria (e.g., as presented in section 5.1.). In an embodiment, predicted KPIs 140A-n can be generated by PM engine component 420 and used as baseline behavior (e.g., by the conflict management component 230) to detect any potential performance degradation arising from conflict between xApps 120A-n.

Figure 6:
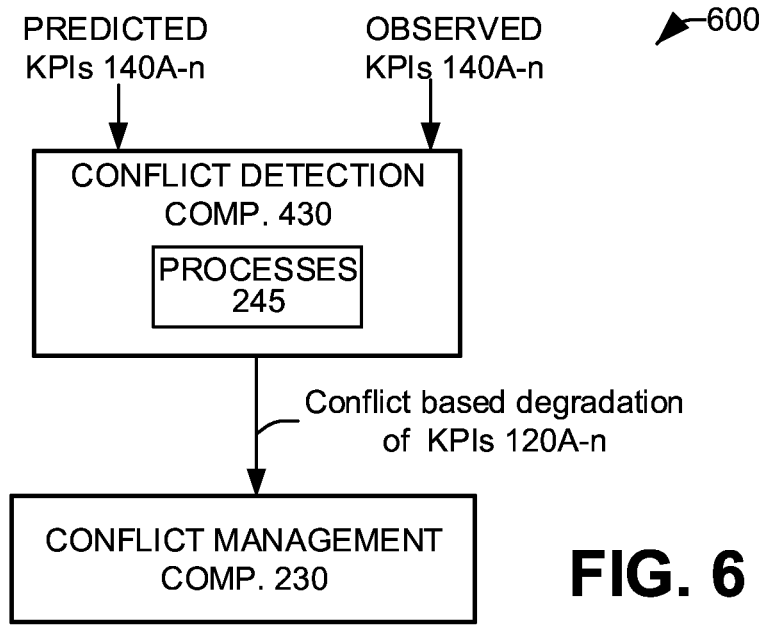
FIG. 6 presents a high level structure of a conflict detection subcomponent, in accordance with an embodiment.

FIG. 6, system 600, presents a high level structure of conflict detection subcomponent 430, in accordance with an embodiment. As shown in FIG. 5, predicted KPIs 140A-n and observed KPIs 140A-n can be inputted into the conflict detection subcomponent 430, whereby the conflict detection subcomponent 430 can be configured to determine if any conflicts exist between the xApps 120A-n that have been accepted for deployment and/or are currently being deployed on RAN 110. Any potential correlation existing between a set of provided predicted KPIs 140A-n and observed KPIs 140A-n can be identified by one or more ML models in processes 245, from which, existence of conflict between xApps 120A-n can be identified in conjunction with estimation of any degradation in the KPIs 140A-n arising from the conflict between the xApps 120A. Any identified degradation in KPIs 120A-n can be utilized by the conflict management component 230.

Figure 7:
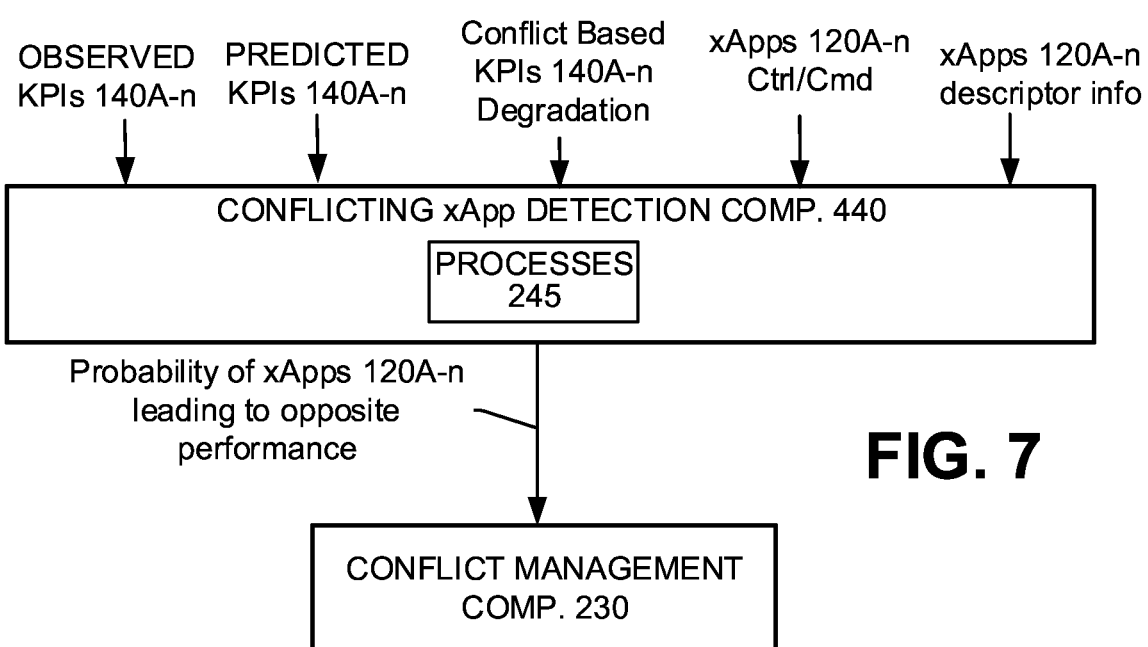
FIG. 7 presents a structural framework for a conflicting xApps detection component configured to detect conflicting xApps, in accordance with an embodiment.

In the event of a conflict being detected between xApps 120A-n during post monitoring, the source of the conflict between xApps 120A-n can be identified. FIG. 7, system 700 presents a structural framework for conflicting xApps detection component 440 configured to detect conflicting xApps 120A-n, in accordance with an embodiment. The conflicting xApps detection component 440 can be configured to identify one or more correlations between respective operations of xApps 120A-n and a corresponding change in performance of the KPIs 140A-n. The conflicting xApps detection component 440 can be further configured to determine an xApp (e.g., xApp 120A) that leads to opposite/ negative performance direction using such inputs as observed KPIs 140A-n, predicted KPIs 140A-n, conflict based degraded KPIs 140A-n, accepted xApps 120A-n control commands, xApp 120A-n descriptor info, and suchlike. As shown in FIG. 6, output of the conflicting xApps detection component 440 can be a probability of xApps 120A-n leading to opposite performance, with the output being an input into the conflict management component 230.

8.3. Conflict Management

For ML based mitigation strategy, any suitable ML technique can be utilized at processes 245, such as reinforcement learning (RL) models. One or more RL models can be configured to choose the control command that leads to the highest performance of KPIs 140A-n. In an example RL model implementation, the reference action space can be defined as a union of conflicting xApps' 120A-n list of proposed actions. The reward is set as a weighted function of conflicting xApps' 120A-n targeted KPIs 140A-n. The targeted KPIs 140A-n can be based on a strategy implemented by an operator of RAN 110, a defined utility function, and suchlike.

An example RL based mitigation algorithmic framework can be provided as follows:

1. Define the state space as idle/active state of subscribed conflicting xApps 120A-n (here defined as xApp v) and associated targeted KPI 140A-n values:

$$s^t = \{U_{v \in V} o_v^t, \Gamma_v^t\},$$

where $o_v^t$ is the targeted KPI value for xApp v and $\Gamma_v^t$ is idle/active state indicator of xApp v at time t and V is a set of conflicting xApps (e.g., xApps 120B-n conflicting with xApp 120A).

2. Define a reference action space as a union of conflicting xApps' list of proposed actions:

$$a^t = U_{v \in V} \tilde{a}_v^t,$$

where $o_v^t$ is the proposed action by xApp v at time t.

3. Set the reward as a weighted function of conflicting xApps' targeted KPIs 140A-n based on operators' strategy or defined utility function:

$$r^t = \Sigma_{v \in V} w_v o_v^t,$$

where $r^t$ is the reward value at time t.

4. Implement any suitable ML (e.g., reinforcement learning (RL) such as Deep Q Network (DQN) methodology) (e.g., in processes 245) to find the action which maximizes the reward.

For the scenarios in which the action spaces of all conflicting xApps 120A-n are logical (e.g., turning on/off, decreasing/increasing guidance, and suchlike) the foregoing approach/methodology can be modified to improve overall performance. Accordingly, the selected action from the winner xApp (e.g., xApp 120A-n) may be different from the proposed action by that specific xApp (e.g., xApp 120A-n). In an embodiment, the conflict management component 230 can be configured to select a logical action from the list of allowed actions which contrasts with the proposed action by the winner xApp (e.g., xApp 120A).

The state space and action space of a modified RL based mitigation algorithm can be defined as:

i) define the state space as idle/active state of subscribed conflicting xApps 120A-n and the targeted KPI 140A-n values, and proposed actions by each xApp 120A-n. The following utilizes the term:

$$s^t = \{=U_{v \in V} o_v^t, \Gamma_v^t, \tilde{a}_v^t\},$$

where $o_v^t$ is the targeted KPI 140A-n value for xApp v, $\Gamma_v^t$ is idle/active state indicator of xApp v, $\tilde{a}_v^t$ is the proposed action by xApp v at time t and V is a set of conflicting xApps.

ii) define a reference action space as a union of conflicting xApps' list of allowed actions:

$$a^t = U_{v \in V} a_v^t,$$

where $a_v^t$ is set of allowed actions for xApp v at time t.

As mentioned, various processes 245 can be configured to determine information, make predictions, etc., regarding operational conflict between two or more xApps 120A-n. As previously mentioned, the processes 245 can include AI, ML and reasoning techniques/technologies that employ probabilistic and/or statistical-based analysis to prognose or infer an action that a user desires to be automatically performed. The various embodiments presented herein can utilize various ML-based schemes for carrying out various aspects thereof, e.g., potential conflict between a first xApp 120A and a second xApp 120B, and further, conflicts between respective xApps 120A-n implemented on the RAN 110, which as mentioned, can be facilitated via an automatic classifier system and process.

As used herein, the terms "predict", "infer", "inference", "determine", and suchlike, refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In the various embodiments presented herein, the CMS 130 can obtain operational data (e.g., data 121A-n, KPIs 140A-n, KPMs 150A-n) from the xAPPs 120A-n regarding the parameters, metrics, use cases, etc., that the respective xAPP 120A-n is configured to control/adjust. The processes 245 can include AI, ML and reasoning techniques/technologies that employ probabilistic and/or statistical-based analysis to prognose or infer an action that a user desires to be automatically performed. The various embodiments presented herein can utilize various ML-based schemes for carrying out various aspects thereof, e.g., determining presence of conflicts between xAPPs 120A-n, as previously mentioned herein, can be facilitated via an automatic classifier system and process.

A classifier is a function that maps an input attribute vector, x=(x1, x2, x3, x4, xn), to a class label class(x). The classifier can also output a confidence that the input belongs to a class, that is, f(x)=confidence(class(x)). Such classification can employ a probabilistic and/or statistical-based analysis (e.g., factoring into the analysis utilities and costs) to prognose or infer an action that a user desires to be automatically performed (e.g., conflict resolution between xApps 120A-n).

A support vector machine (SVM) is an example of a classifier that can be employed. The SVM operates by finding a hypersurface in the space of possible inputs that splits the triggering input events from the non-triggering events in an optimal way. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein is inclusive of statistical regression that is utilized to develop models of priority.

As will be readily appreciated from the subject specification, the various embodiments can employ classifiers that are explicitly trained (e.g., via a generic training data) as well as implicitly trained (e.g., via observing behavior of xApps 120A-n, RAN 110 behavior, receiving extrinsic information, and suchlike). For example, SVM's are configured via a learning or training phase within a classifier constructor and feature selection module. Thus, the classifier(s) can be used to automatically learn and perform a number of functions, including but not limited to determining according to predetermined criteria, e.g., whether an operational conflict exists, performance of KPIs 140A-n, operational goal(s) of respective xApps 120A-n, direct conflicts, indirect conflicts, implicit conflicts, and suchlike.

As described supra, inferences can be made, and operations performed, based on numerous pieces of information. For example, information/data (e.g., data 121A-n) regarding implementing xApps 120A-n, historical usage, predicted usage, etc., as operation of the xApps 120A-n continues, enabling analysis to determine converging patterns such that inferences can be made regarding powering conflict between respective xApps 120A-n.

Figure 8:
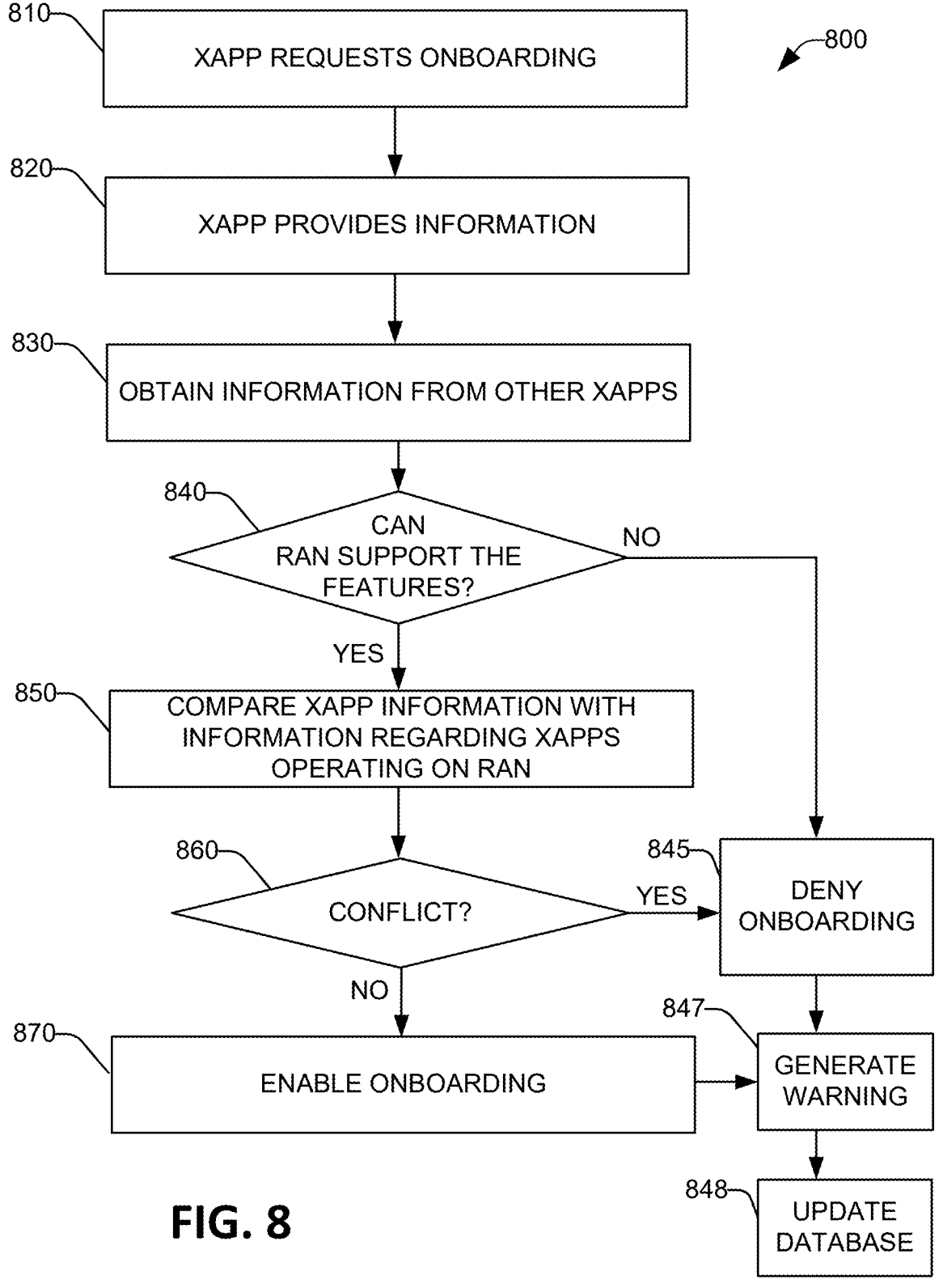
FIG. 8 illustrates a methodology for determining whether an operational conflict arises by implementing an xApp on a RAN, in accordance with one or more embodiments described herein.

FIG. 8, illustrates methodology 800 for determining whether an operational conflict arises by implementing an xApp on a RAN, in accordance with one or more embodiments described herein.

At 810, a first xApp (e.g., xApp 120A) requests to be onboarded onto a RAN (e.g., RAN 110) to enable the xApp to control one or more parameters, use cases, etc., on the RAN.

At 820, the first xApp can be configured to provide first information (e.g., data 121A) to an onboarding component (e.g., onboarding component 210). The first information can detail which parameter, use case, metric, KPI (e.g., any of KPIs 140A-n), and suchlike, the first xApp is being deployed to adjust.

At 830, in an embodiment, other information can be obtained (e.g., by the onboarding component 210) from other xApps (e.g., xApps 120A-n were presented for onboarding, were onboarded, deployed, etc.), wherein the other information can be stored (e.g., by the onboarding component 210) in a database (e.g., database 250, subscription database 260). For example, second information pertaining to a second xApp can be stored in the database, and subsequently compared with the first information of the first xApp.

At 840, the first information can be compared with an operational configuration information of the RAN to determine whether the xApp can be supported by the RAN. In an embodiment, the operational configuration information for the RAN can be derived from the respective xApps that are currently deployed/previously deployed at the RAN. For example, the first information of the first xApp can be compared with the information (e.g., data 121B-n) available from the other xApps (e.g., xApps 120B-n). Based thereon, it may be possible to determine what the RAN can support based on the information (e.g., data 121B-n) in terms of what other xApps were denied onboarding (e.g., by the onboarding component 210). In the event of a determination that NO, the RAN is unable to support the first xApp, methodology 800 can advance to 845 where the first xApp can be denied onboarding (e.g., by the onboarding component 210). At 847, a warning (e.g., warning 236A-n) can be generated by a warning component (e.g., warning component 235) to inform an entity such as a network operator of the denied onboarding of the first xApp. At 848, a database (e.g., either of databases 250 and/or 260) can be updated (e.g., by onboarding component 210) with the respective information (e.g., data 121A) regarding the first xApp being denied onboarding.

At 840, in the event of the RAN is determined (e.g., by the onboarding component 210) to be able to support the first xApp, methodology 800 can advance to 850. At 850, the first information (e.g., data 121A) regarding the first xApp can be compared with the other information (e.g., data 121B-n) to determine (e.g., by subscription management component 220 in conjunction with conflict management component 230) whether the first xApp conflicts with other any of the other xApps. For example, the first information (e.g., data 121A) of the first xApp (e.g., xApp 120A) can be compared with second information (e.g., data 121B) of a second xApp (e.g., xApp 120B) to determine whether a conflict exists.

At 860, a determination (e.g., by conflict management component 230) can be made regarding whether a conflict exists between the first xApp and the second xApp. In the event of YES, a conflict exists, the first xApp can be denied subscription to the RAN, with methodology 800 returning to 845, as previously described, wherein the warning(s) and database updates can be configured to convey the conflict between the first xApp and the second xApp.

Figure 9:
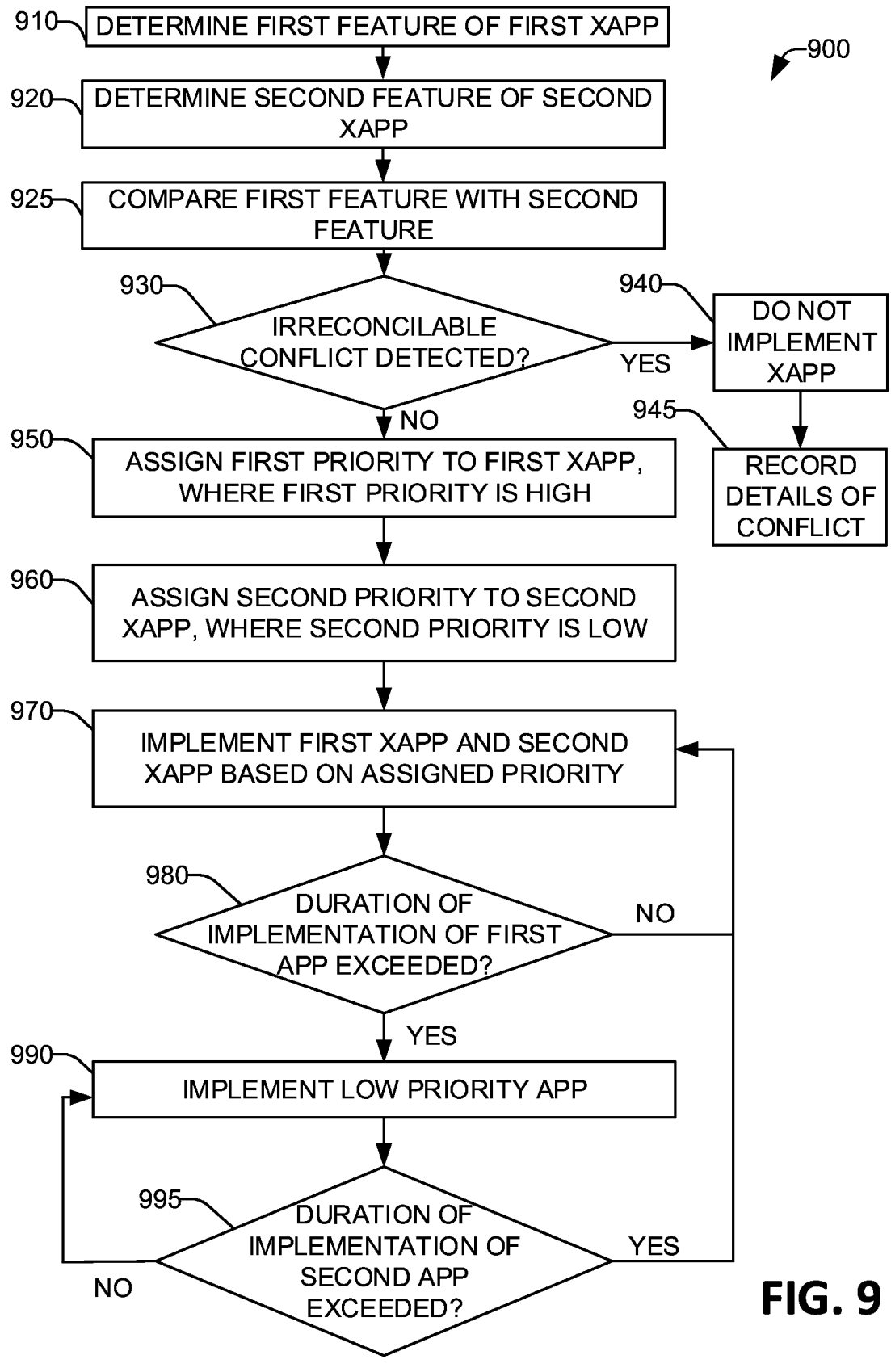
FIG. 9 illustrates a methodology for determining whether an operational conflict arises by implementing an xApp on a RAN, in accordance with one or more embodiments described herein.

At 860, in the event of a determination (e.g., by conflict management component 230) that there is no conflict between the first xApp and the second xApp, methodology can advance to 870, whereupon the first xApp can be onboarded (e.g., by the subscription management component 220) onto the RAN. Methodology 800 can return to 847, as previously described, wherein, in an embodiment, an indicator (e.g., an alarm 236A-n) can be generated and transmitted (e.g., by warning(s) component 235) and, further, at 848, the database (e.g., either of databases 250 and/or 260) updated (e.g., data 121A-n) to indicate the first xApp was onboarded/deployed/implemented, with no conflict between the first xApp and the second xApp. It is to be noted that actions performed at steps 847 and 848 can be conducted by any of the operations presented throughout this application, e.g., a notification can be generated and operational data updated/stored at any event occurring in the RAN 110, nodes 115, CMS 130, RIC, SMO 135, O-cloud 160, E2T 270, FIG. 9, illustrates methodology 900 for determining whether an operational conflict arises by implementing an xApp on a RAN, in accordance with one or more embodiments described herein.

At 910, as previously described, a first xApp (e.g., xApp 120A) can be configured to provide first information (e.g., data 121A) to a subscription component (e.g., subscription management component 220). The first information can detail which metric, parameter, use case, KPI (e.g., any of KPIs 140A-n), and suchlike, the first xApp is being deployed to adjust (e.g., target 212A).

At 920, a second xApp (e.g., xApp 120B) can be configured to provide second information (e.g., data 121B) to a subscription component (e.g., subscription management component 220). The second information can detail which metric, parameter, use case, KPI (e.g., any of KPIs 140A-n), and suchlike, the second xApp is deployed to adjust.

At 925, the first metric to be adjusted by the first xApp can be compared (e.g., by conflict management component 230) with the second metric to be adjusted by the second xApp. In an embodiment, the first metric and the second metric can have a common control target (e.g., target 212A).

At 930, the presence of a conflict on the RAN (e.g., RAN 110) and the magnitude of the conflict can be determined by a conflict component (e.g., conflict management component 230). In the event of implementation of the first xApp would deleteriously affect operation of the second xApp regarding control of the common target, a further determination can be made, e.g., by the conflict component, regarding whether the first xApp and the second xApp might be able to co-exist. In the event of the conflict would lead to the second xApp not being able to effectively control the common target, methodology 900 can advance to 940, whereupon the first xApp can be denied (e.g., by conflict management component 230) implementation on the RAN. At 945, a database (e.g., either of databases 250 and/or 260) can be updated (e.g., by onboarding component 210) with the respective information (e.g., data 121A, information regarding the respective conflicting xApps 120A-n, and suchlike) regarding the first xApp being denied onboarding.

At 930, in the event of implementation of the first xApp may negatively affect control of the target by the second xApp, but the first xApp and second xApp can be configured to be co-deployed on the RAN, methodology 900 can advance to 950.

At 950, a first priority of operation can be assigned (e.g., by subscription management component 220) to the first xApp (e.g., as part of data 121A), wherein the priority can be assigned a first level, e.g., "high".

At 960, a second priority of operation can be assigned (e.g., by subscription management component 220) to the second xApp (e.g., as part of data 121B), wherein the priority can be assigned a second level, e.g., "low".

At 970, the first xApp and the second xApp can be implemented on the RAN based on their respective first priority and second priority. In an embodiment, the first priority can be used to control operation when the first xApp operates when information pertaining to the first metric is present at the RAN, otherwise the lower priority, second xApp is implemented. In another embodiment, the first priority and second priority can be established based on time. For example, the first xApp is configured to operate for a first duration, and then the second xApp is configured to operate for a second duration.

At 980, with the first xApp implemented based on the first priority, the duration of operation of the first xApp can be monitored. In the event of the first duration of implementation has yet to expire, methodology 900 can return to 970 to further monitor operation of the first xApp.

At 980, in the event of the first duration of implementation having expired, methodology 900 can advance to 990, for implementation of the low priority, second xApp having the second duration.

At 995, with the second xApp implemented based on the second priority, the duration of operation of the second xApp can be monitored. In the event of the second duration of implementation has yet to expire, methodology 900 can return to 990 to further monitor operation of the second xApp. At 995, in the event of the second duration of implementation having expired, methodology 900 can return to 970, for re-implementation of the first xApp having the first duration.

Figure 10:
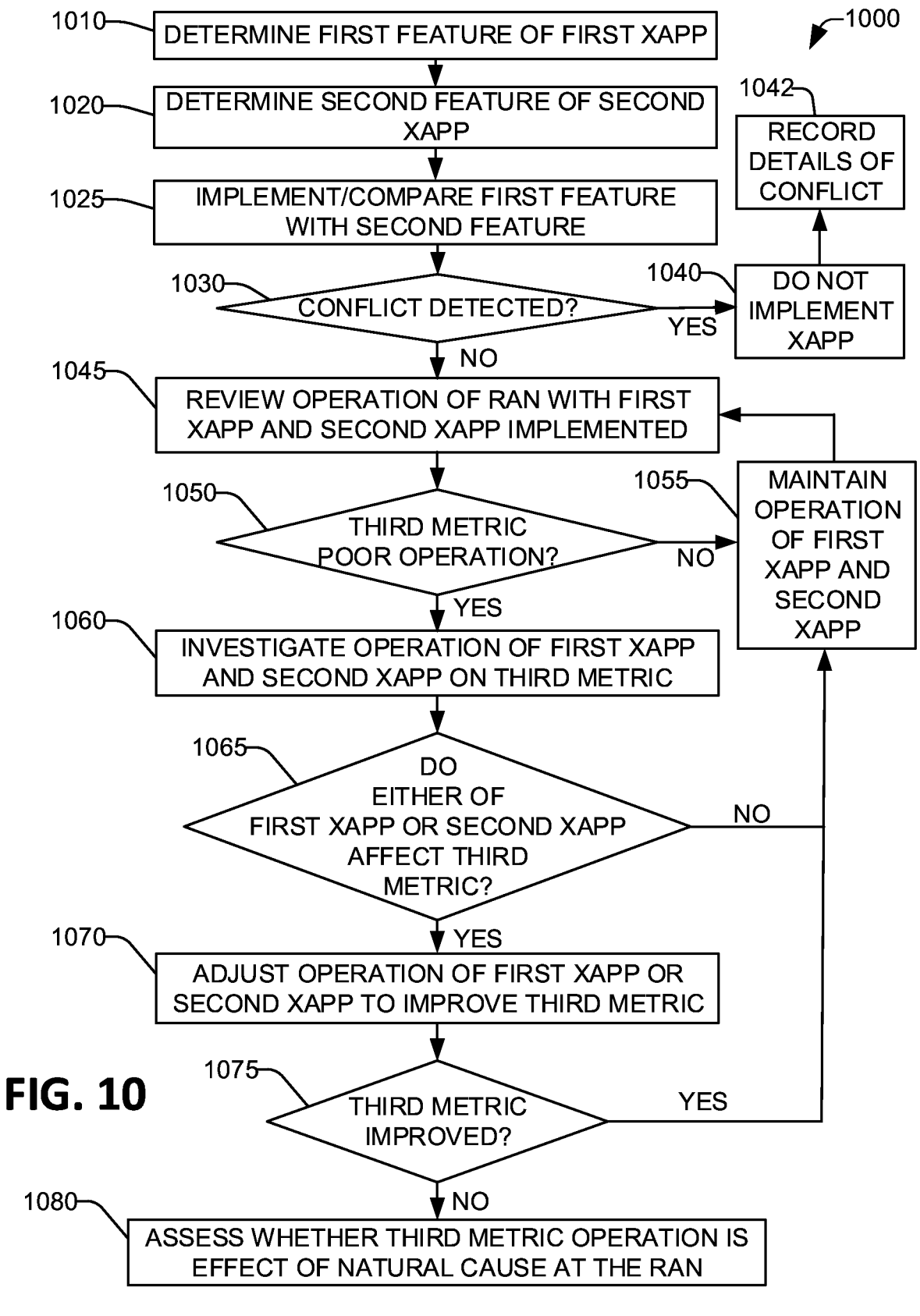
FIG. 10 illustrates a methodology for determining whether an operational conflict arises by implementing an xApp on a RAN, in accordance with one or more embodiments.

FIG. 10, illustrates methodology 1000 for determining whether an operational conflict arises by implementing an xApp on a RAN, in accordance with one or more embodiments described herein.

At 1010, as previously described, a first xApp (e.g., xApp 120A) can be configured to provide first information (e.g., data 121A) to a subscription component (e.g., subscription management component 220). The first information can detail which metric, parameter, use case, KPI (e.g., any of KPIs 140A-n), and suchlike, the first xApp is being deployed to adjust (e.g., target 212A).

At 1020, a second xApp (e.g., xApp 120B) can be configured to provide second information (e.g., data 121B) to a subscription management component (e.g., subscription management component 220). The second information can detail which metric, parameter, use case, KPI (e.g., any of KPIs 140A-n), and suchlike, the second xApp is deployed to adjust (e.g., also target 212A).

At 1025, implementation of the first xApp can be requested. The first metric to be adjusted by the first xApp can be compared (e.g., by conflict management component 230) with the second metric to be adjusted by the second xApp. In an embodiment, the first metric and the second metric can have a common control target (e.g., target 212A).

At 1030, the presence of a conflict on the RAN (e.g., RAN 110) can be determined by a conflict component (e.g., conflict management component 230). In the event of implementation of the first xApp would deleteriously affect operation of the second xApp regarding control of the common target, methodology 1000 can advance to 1040, where the first xApp can be denied (e.g., by conflict management component 230) implementation on the RAN. At 1042, the respective information regarding the conflict can be recorded (e.g., by onboarding component 210 in database 250 and/or 260), such as information regarding one or more features to be controlled by the first xApp, one or more features to be controlled by the second xApp, the nature of the conflict, etc.

At 1030, in the event of a determination that NO, implementation of the first xApp would not negatively affect control of the target by the second xApp, methodology 1000 can advance to 1045. In an embodiment, the first xApp and the second xApp can be considered to be disparate.

At 1045, operation of the RAN can be reviewed in view of the first xApp and the second xApp being co-deployed. As previously mentioned, direct conflicts between co-operation of xApps may be readily discernible, however, indirect and implicit conflicts may be harder to detect/identify. In an embodiment, other metrics, e.g., a third metric, may be impacted by the operation of the first xApp and the second xApp. Operation of the third metric can be monitored to see if the third metric is negatively affected by the co-deployment of the first xApp and the second xApp.

At 1050, a determination can be made regarding the operation of the third metric, for example, is the third metric operating worse than when compared to a prior situation where the first xApp and the second xApp were not co-deployed? In the event of a determination that the co-deployment of the first xApp and the second xApp does NOT adversely affect the third metric, methodology 1000 can advance to 1055, whereupon the co-deployment of the first xApp and the second xApp can be maintained. Step/act 1055 can further return to 1045 for further/subsequent determination of whether the co-deployment of the first xApp and the second xApp affects operation of the RAN. Accordingly, the RAN can be continually monitoring operation thereon to detect a conflict that may not be present when the first xApp and the second xApp are co-deployed, but rather, the conflict develops/reveals itself over time.

At 1050, in the event of a determination that YES, the co-deployment of the first xApp and the second xApp does adversely affect the third metric, methodology 1000 can advance to 1060 to determine effects of the co-deployed first xApp and the second xApp (singly or in combination) on the third metric.

At 1065, in the event of, NO, the first xApp and/or the second xApp are not responsible for the poor operation of the third metric, methodology 1000 can return to 1055 for further monitoring of the co-deployed first xApp and the second xApp, as previously mentioned.

At 1065, in the event of, YES, the first xApp and/or the second xApp are affecting operation of the third metric, methodology 1000 can advance to 1070, whereupon analysis can be conducted by the conflict detection component (e.g., conflict detection component 240) to adjust operation to the co-deployed first xApp and the second xApp to isolate the respective effects of the first xApp and the second xApp on the third metric.

At 1075, in the event of a determination that YES, adjustment of the first xApp and/or the second xApp can have an effect (e.g., beneficial) on the third metric, methodology 1000 can return to 1055, whereupon the modified operation of the first xApp and/or the second xApp can be maintained.

At 1075, in the event of a determination that NO, adjustment of the first xApp and/or the second xApp are not affecting the third metric, methodology 1000 can advance to

1080, whereupon further analysis can be performed to determine whether the effect on operation of the third metric is a result of a natural change in the RAN, as previously mentioned.

Figure 11:
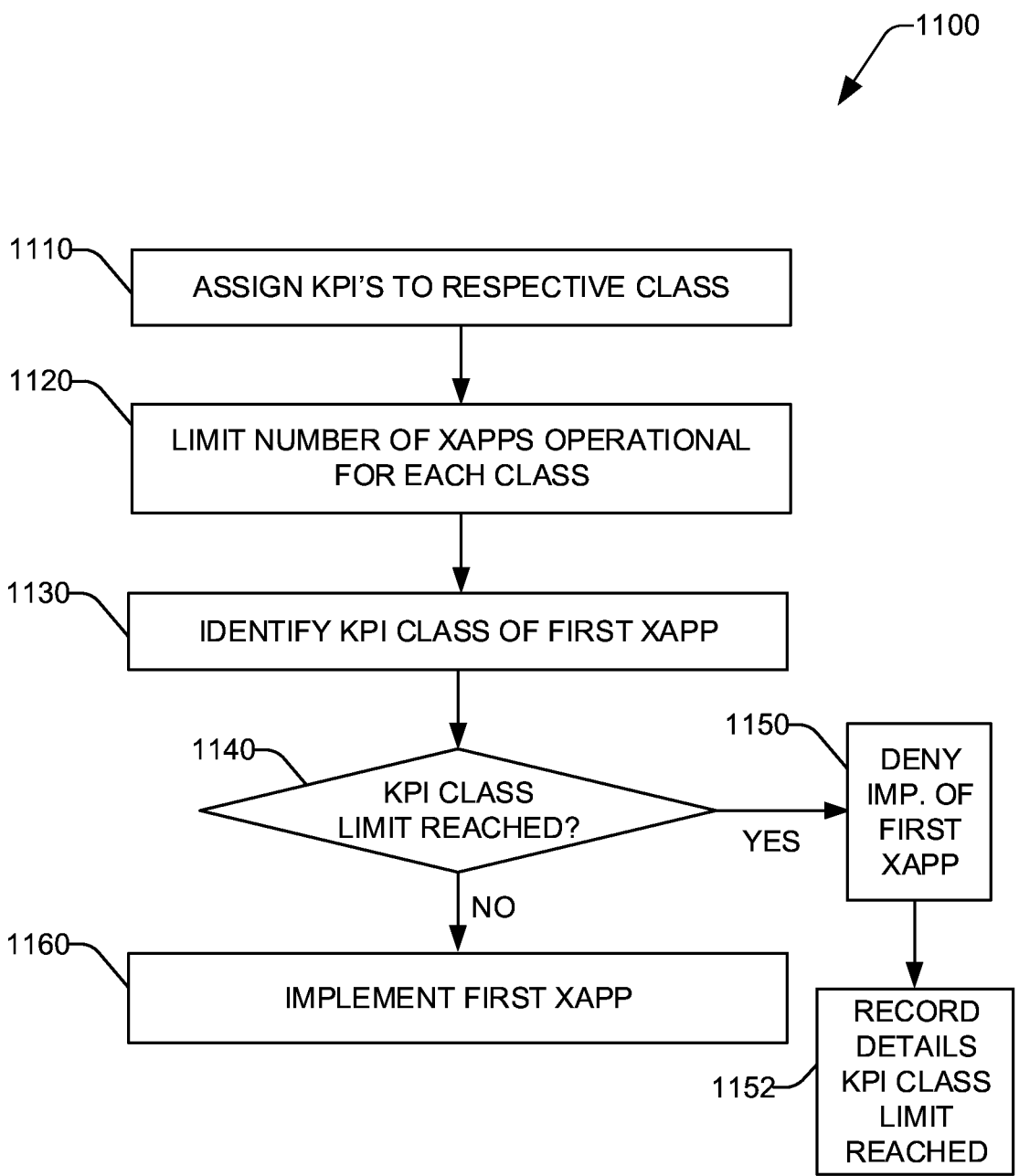
FIG. 11 illustrates a methodology for deploying an xApp on a RAN based on KPI class, in accordance with one or more embodiments described herein.

FIG. 11, illustrates methodology 1100 for deploying an xApp on a RAN based on KPI class, in accordance with one or more embodiments described herein.

At 1110, respective KPIs can be separated into classes, whereby each KPI can have its own class.

At 1120, to prevent an excessive number of xApps (e.g., xApps 120A-n) being assigned to a particular KPI (e.g., KPIs 140A-n, such as a metric, use case, etc., and/or each of targets 212A and 212B), each KPI can be assigned a maximum number of xApps that can operate on that KPI. Limiting the number of xApps that can be associated with a particular KPI can limit the likelihood of conflict between xApps operating with the particular KPI.

At 1130, as an xApp is requesting implementation (e.g., as part of subscription) the KPI/metric (e.g., a first metric) of focus of the xApp can be identified (e.g., in data 121A) by an onboarding component (e.g., onboarding component 210).

At 1140, a determination can be made, e.g., by the onboarding component, as to whether the number of xApps that can be assigned to a particular KPI has been reached. E.g., has the maximum number of xApps that can be assigned to the first KPI/metric been reached? In the event of a determination that YES, the maximum number of xApps for the first KPI/metric has been reached, methodology 1100 can advance to 1150, whereupon the requesting onboarding xApp (e.g., xApp 120A) can be denied implementation by the onboarding component. At 1152, the details regarding the KPI class limit being reached can be stored, e.g., by the onboarding component in a database (e.g., database 250 and/or 260).

At 1140, in the event of a determination that NO, the maximum number of xApps for the first KPI/metric has not been reached, methodology 1100 can advance to 1160, whereupon the requesting onboarding xApp (e.g., xApp 120A) can be granted implementation of the RAN by the onboarding component.

FIG. 12, illustrates methodology 1200 for deploying an xApp on a RAN, in accordance with one or more embodiments described herein.

At 1210, one or more operating conditions of a RAN (e.g., RAN 110) or a node (e.g., any of nodes 115) can be recorded (e.g., by rollback component 248). The one or more operating conditions (e.g., as operational data 241A-n) can be stored (e.g., in databases 250 and 250) as previously described, e.g., a times T1, T2, T3, T4, T5, Tn, etc.

At 1220, a first xApp (e.g., xApp 120A) can be implemented on the RAN, node, etc., wherein the first xApp can be configured to control operation of a first control parameter which is further configured to control an operational feature of the RAN, node, etc.

At 1230, operation of the RAN, node, etc., can be monitored and reviewed (e.g., by any of CMS 130, subscription management component 220, the conflict detection component 240, etc.), e.g., with the first xApp operational.

At 1240, in response to a determination that NO, operation of the RAN, node, device, etc., is not degraded, methodology 1200 can advance to 1250, wherein the implementation of the first xApp can be maintained for further operational monitoring/review at 1230.

At 1240, in response to a determination that YES, operation of the RAN, node, device, etc., is degraded (e.g., a KPI 140A indicates degraded operation), methodology 1200 can advance to 1260, whereupon operation of the first xApp can be terminated (e.g., by conflict management component 230).

At 1270, a rollback instruction (e.g., rollback instruction 320) can be generated and transmitted (e.g., by conflict management component 230) to rollback operation of the RAN, node, etc., to a prior operational state, e.g., an operational state prior to implementation of the first xApp. Based on the rollback instruction (e.g., received and processed by rollback component 248), operational rollback can be conducted (e.g., received and processed by rollback component 248), with operation returned from a current state (e.g., in operation data 241A) to a prior state (e.g., in operation data 241B).

At 1280, the reason for the rollback can be identified (e.g., by conflict management component 230 in conjunction with rollback component 248) and stored (e.g., data 121A-n), wherein the stored data can include the information in the rollback instruction, first xApp, second xApp, timing, subscription information, the determined conflict, etc. The information/data stored at the time of the rollback can function as historical data against which a future implementation of an xApp can be compared with, e.g., during onboarding.

At 1290, a notification (e.g., alarm 236A-n) can be generated (e.g., by warning component 235 under instruction from conflict management component 230, rollback component 248, etc.) and transmitted to one or more components, e.g., at the RAN, at the node, etc., indicating that a rollback operation has occurred.

Figure 13:
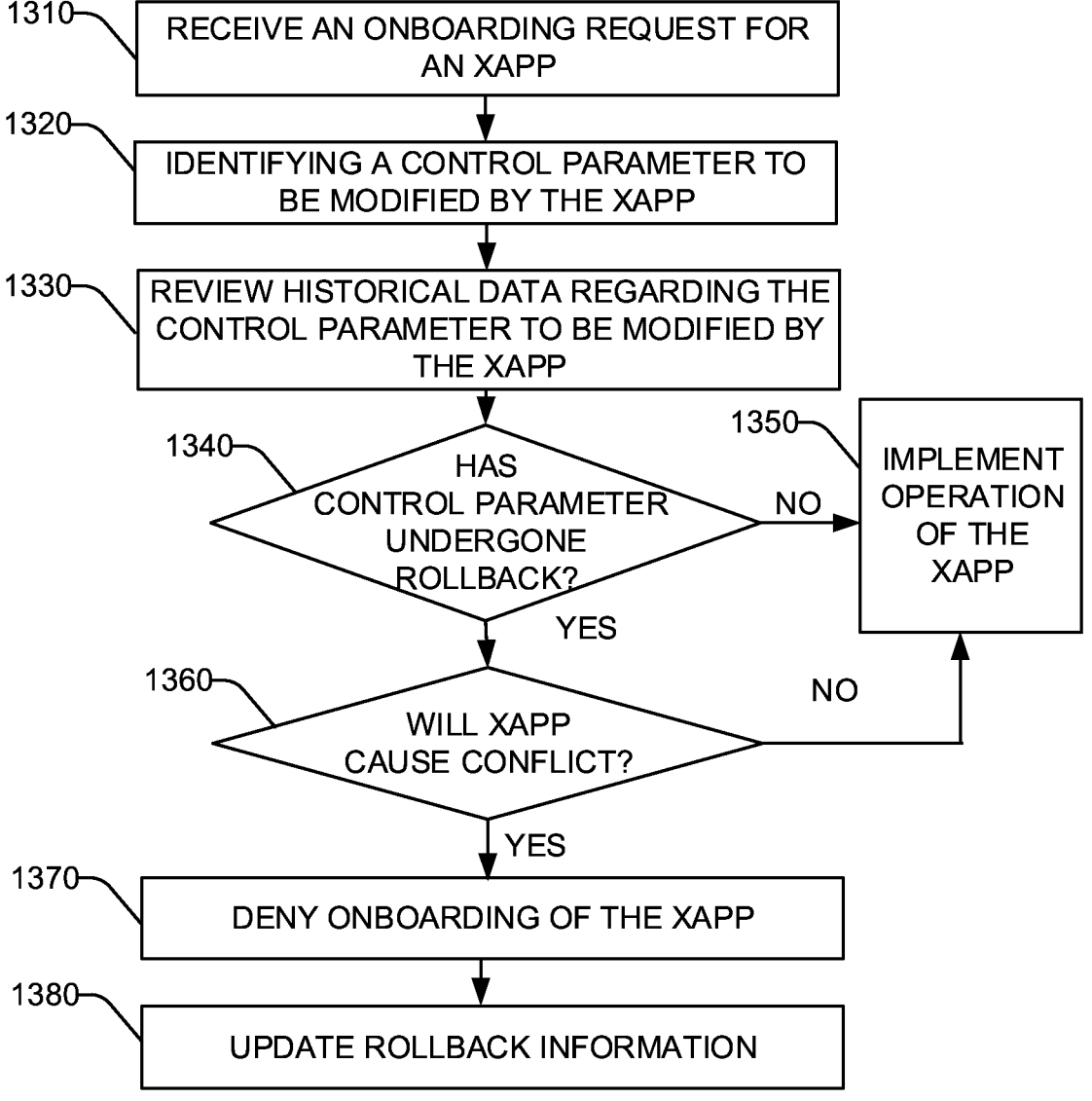
FIG. 13 illustrates a methodology for deploying an xApp on a RAN, in accordance with one or more embodiments described herein.

FIG. 13, illustrates methodology 1300 for deploying an xApp on a RAN, in accordance with one or more embodiments described herein.

At 1310, an onboarding request can be received by an onboarding component (e.g., at onboarding component 210) to implement a first xApp (e.g., xApp 120A) onboard a RAN (e.g., RAN 110), a node (e.g., any of nodes 115), other system/device associated with the RAN (e.g., SMO 130, RIC 150, E2T 270, CMS 130, etc.).

At 1320, as part of the onboarding process, the first xApp can be reviewed, e.g., by the onboarding component to identify/determine (e.g., in data 121A-n) one or more control parameters/features/targets (e.g., target 212A-n), etc., that the first xApp is configured to control.

At 1330, the onboarding component can be configured to compare the control parameter in the first xApp with historical data (e.g., data 121B-n, operational data 241A-n, prior KPI's 140A-n, prior KPM's 150A-n, etc.) to determine a prior operational history/interaction with the control parameter, e.g., to determine whether implementation of the first xApp may give rise to a conflict, whether there has been a prior rollback of an xApp 120A-n relating to the control parameter, etc. In reviewing the historical data, the onboarding component can be configured to access the data store (e.g., either of databases 250/260). In an embodiment, the historical data can be generated by components/devices included in the RAN, RIC, SMO, etc., as well as generated by, and received from, one or more of the user devices interacting with the RAN, as well as node elements (e.g., any of nodes 115).

At 1340, in response to a determination, e.g., by the onboarding component, that there is NO prior history regarding a rollback or conflict pertaining to the control parameter, methodology 1300 can advance to 1350, whereby the first xApp can be implemented.

At 1340, in response to a determination, e.g., by the onboarding component, that YES there is a prior history regarding a rollback(s) or conflict(s) pertaining to the control parameter, methodology 1300 can advance to 1360, whereupon a determination can be made, e.g., by the onboarding component, a rollback component (e.g., rollback component 248), a conflict management component (e.g., conflict management component 230), a subscription management component (e.g., subscription management component 230), etc., whether implementation of the first xApp and how the first xApp is going to adjust/modify the control parameter will give rise to a conflict. At 1360, in response to a determination that NO, the first xApp will not cause a conflict, methodology 1300 can return to 1350 for the xApp to be implemented.

At 1360, in response to a determination that YES, a conflict will occur in the event of the first xApp being implemented, methodology 1300 can advance to 1370, whereupon implementation of the first xApp can be denied, e.g., by the onboarding component.

At 1380, the rollback information/operational history data (e.g., data 121A-n, operational data 241A-n) can be updated with the denial of onboarding of the first xApp and/or the successful implementation of the first xApp to maintain historical data for future operational reviews/subscription requests/onboarding requests, etc.

9. EXAMPLE ENVIRONMENTS OF USE

Figure 14:
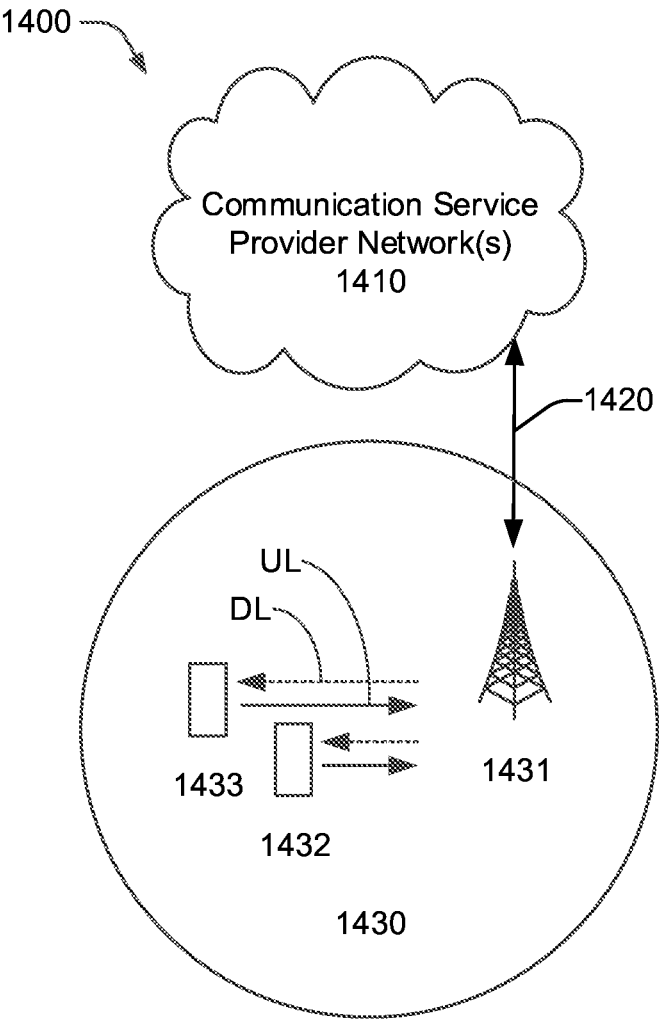
FIG. 14 illustrates an example wireless communication system, in accordance with one or more embodiments described herein.

FIG. 14 illustrates an example wireless communication system 1400, in accordance with one or more embodiments described herein. The example wireless communication system 1400 comprises communication service provider network(s) 1410, a network node 1431, and user equipment (UEs) 1432, 1433. A backhaul link 1420 connects the communication service provider network(s) 1410 and the network node 1431. The network node 1431 can communicate with UEs 1432, 1433 within its service area 1430. The dashed arrow lines from the network node 1431 to the UEs 1432, 1433 represent downlink (DL) communications to the UEs 1432, 1433. The solid arrow lines from the UEs 1432, 1433 to the network node 1431 represent uplink (UL) communications.

In general, with reference to FIG. 14, the non-limiting term "user equipment" can refer to any type of device that can communicate with network node 1431 in a cellular or mobile communication system 1400. UEs 1432, 1433 can have one or more antenna panels having vertical and horizontal elements. Examples of UEs 1432, 1433 comprise target devices, device to device (D2D) UEs, machine type UEs or UEs capable of machine to machine (M2M) communications, personal digital assistants (PDAs), tablets, mobile terminals, smart phones, laptop mounted equipment (LME), universal serial bus (USB) dongles enabled for mobile communications, computers having mobile capabilities, mobile devices such as cellular phones, laptops having laptop embedded equipment (LEE, such as a mobile broadband adapter), tablet computers having mobile broadband adapters, wearable devices, virtual reality (VR) devices, heads-up display (HUD) devices, smart cars, machine-type communication (MTC) devices, augmented reality head mounted displays, and the like. UEs 1432, 1433 can also comprise IoT devices that communicate wirelessly.

In various embodiments, system 1400 comprises communication service provider network(s) 1410 serviced by one or more wireless communication network providers. Communication service provider network(s) 1410 can comprise a "core network". In example embodiments, UEs 1432, 1433 can be communicatively coupled to the communication service provider network(s) 1410 via a network node 1431. The network node 1431 can communicate with UEs 1432, 1433, thus providing connectivity between the UEs 1432, 1433 and the wider cellular network. The UEs 1432, 1433 can send transmission type recommendation data to the network node 1431. The transmission type recommendation data can comprise a recommendation to transmit data via a closed loop multiple input multiple output (MIMO) mode and/or a rank-1 precoder mode.

Network node 1431 can have a cabinet and other protected enclosures, computing devices, an antenna mast, and multiple antennas for performing various transmission operations (e.g., MIMO operations) and for directing/steering signal beams. Network node 1431 can comprise one or more base station devices which implement features of the network node. Network nodes can serve several cells, depending on the configuration and type of antenna. In example embodiments, UEs 1432, 1433 can send and/or receive communication data via wireless links to the network node 1431.

Communication service provider networks 1410 can facilitate providing wireless communication services to UEs 1432, 1433 via the network node 1431 and/or various additional network devices (not shown) included in the one or more communication service provider networks 1410. The one or more communication service provider networks 1410 can comprise various types of disparate networks, including but not limited to: cellular networks, femto networks, picocell networks, microcell networks, internet protocol (IP) networks Wi-Fi service networks, broadband service network, enterprise networks, cloud-based networks, millimeter wave networks and the like. For example, in at least one implementation, system 1400 can be or comprise a large-scale wireless communication network that spans various geographic areas. According to this implementation, the one or more communication service provider networks 1410 can be or comprise the wireless communication network and/or various additional devices and components of the wireless communication network (e.g., additional network devices and cell, additional UEs, network server devices, etc.).

The network node 1431 can be connected to the one or more communication service provider networks 1410 via one or more backhaul links 1420. The one or more backhaul links 1420 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 1420 can also comprise wireless link components, such as but not limited to, line-of-sight (LOS) or non-LOS links which can comprise terrestrial air-interfaces or deep space links (e.g., satellite communication links for navigation). Backhaul links 1420 can be implemented via a "transport network" in some embodiments. In another embodiment, network node 1431 can be part of an integrated access and backhaul network. This may allow easier deployment of a dense network of self-backhauled 5G cells in a more integrated manner by building upon many of the control and data channels/procedures defined for providing access to UEs 1432, 1433.

Wireless communication system 1400 can employ various cellular systems, technologies, and modulation modes to facilitate wireless radio communications between devices (e.g., the UEs 1432, 1433 and the network node 1431). While example embodiments might be described for 5G new radio (NR) systems, the embodiments can be applicable to any radio access technology (RAT) or multi-RAT system where the UE operates using multiple carriers, e.g., LTE FDD/TDD, GSM/GERAN, CDMA2000 etc.

For example, system 1400 can operate in accordance with any 5G, next generation communication technology, or existing communication technologies, various examples of which are listed supra. In this regard, various features and functionalities of system 1400 are applicable where the devices (e.g., the UEs 1432, 1433 and the network node 1431) of system 1400 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g., interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 1400 can be configured to provide and employ 5G or subsequent generation wireless networking features and functionalities. 5G wireless communication networks are expected to fulfill the demand of exponentially increasing data traffic and to allow people and machines to enjoy gigabit data rates with virtually zero (e.g., single digit millisecond) latency. Compared to 4G, 5G supports more diverse traffic scenarios. For example, in addition to the various types of data communication between conventional UEs (e.g., phones, smartphones, tablets, PCs, televisions, internet enabled televisions, AR/VR head mounted displays (HMDs), etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of 5G networks can comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks can allow for: data rates of several tens of megabits per second should be supported for tens of thousands of users, 1 gigabit per second to be offered simultaneously to tens of workers on the same office floor, for example, several hundreds of thousands of simultaneous connections to be supported for massive sensor deployments; improved coverage, enhanced signaling efficiency; reduced latency compared to LTE.

The 5G access network can utilize higher frequencies (e.g., >6 GHz) to aid in increasing capacity. Currently, much of the millimeter wave (mmWave) spectrum, the band of spectrum between 30 GHz and 300 GHz is underutilized. The millimeter waves have shorter wavelengths that range from 9 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the 3GPP and has been in use (including with LTE), is a multi-antenna technique that can improve the spectral efficiency of transmissions, thereby significantly boosting the overall data carrying capacity of wireless systems. The use of MIMO techniques can improve mmWave communications and has been widely recognized as a potentially important component for access networks operating in higher frequencies. MIMO can be used for achieving diversity gain, spatial multiplexing gain and beamforming gain. For these reasons, MIMO systems are an important part of the 3rd and 4th generation wireless systems and are in use in 5G systems.

In order to provide additional context for various embodiments described herein, FIG. 14 and the following discussion are intended to provide a brief, general description of a suitable computing environment 1400 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Figure 15:
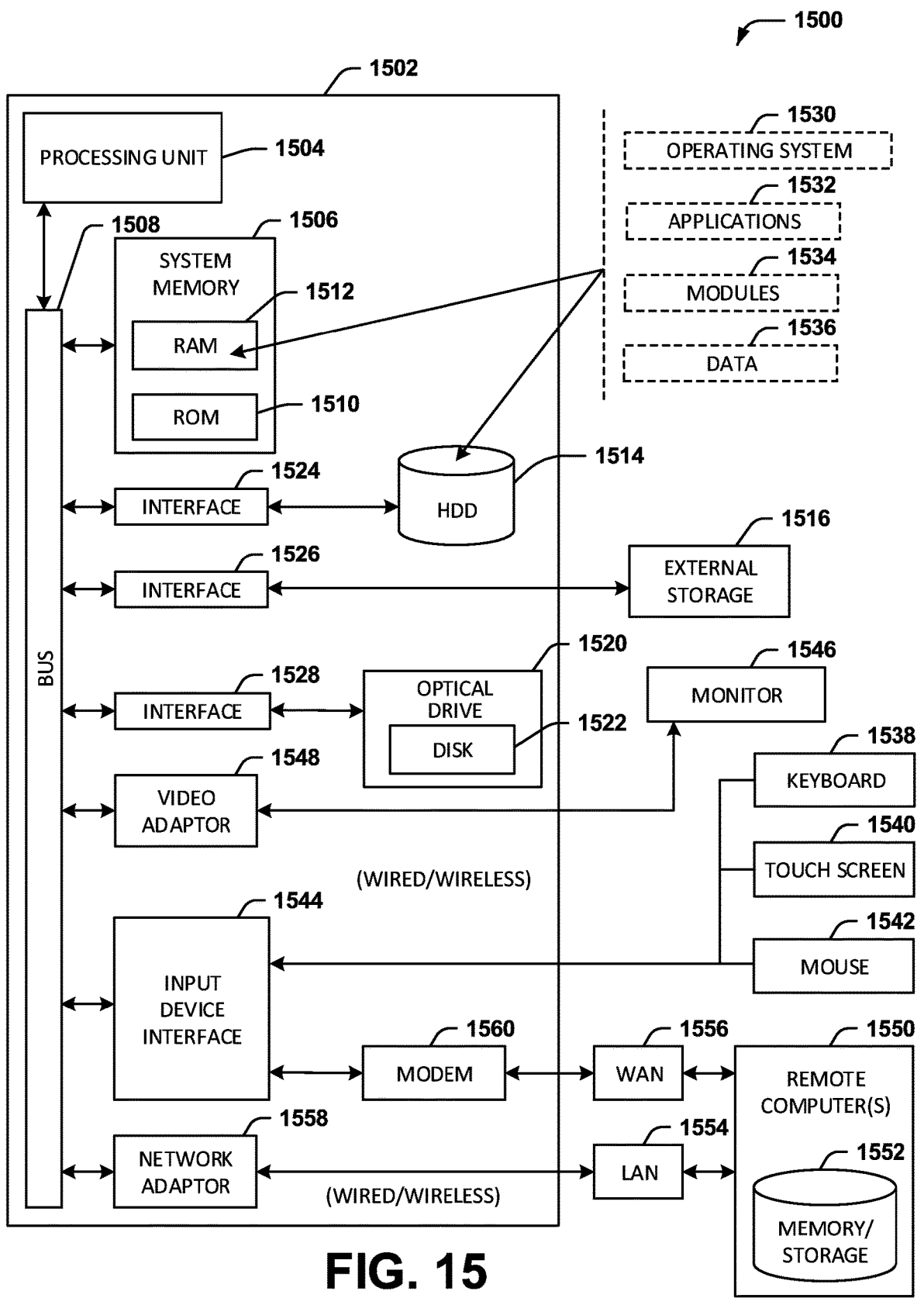
FIG. 15 presents an example environment for implementing various embodiments presented herein.

With reference to FIG. 15, the example environment 1500 for implementing various embodiments of the aspects described herein includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors and may include a cache memory. Dual microprocessors and other multi-processor architectures can also be employed as the processing unit 1504.

The system bus 1508 can be any of several types of bus structure that can further interconnect to a memory bus (with or without a memory controller), a peripheral bus, and a local bus using any of a variety of commercially available bus architectures. The system memory 1506 includes ROM 1510 and RAM 1512. A basic input/output system (BIOS) can be stored in a non-volatile memory such as ROM, erasable programmable read only memory (EPROM), EEPROM, which BIOS contains the basic routines that help to transfer information between elements within the computer 1502, such as during startup. The RAM 1512 can also include a high-speed RAM such as static RAM for caching data.

The computer 1502 further includes an internal hard disk drive (HDD) 1514 (e.g., EIDE, SATA), one or more external storage devices 1516 (e.g., a magnetic floppy disk drive (FDD) 1516, a memory stick or flash drive reader, a memory card reader, etc.) and an optical disk drive 1550 (e.g., which can read or write from a CD-ROM disc, a DVD, a BD, etc.). While the internal HDD 1514 is illustrated as located within the computer 1502, the internal HDD 1514 can also be configured for external use in a suitable chassis (not shown). Additionally, while not shown in environment 1500, a solid-state drive (SSD) could be used in addition to, or in place of, an HDD 1514. The HDD 1514, external storage device(s) 1516 and optical disk drive 1550 can be connected to the system bus 1508 by an HDD interface 1524, an external storage interface 1526 and an optical drive interface 1528, respectively. The interface 1524 for external drive implementations can include at least one or both of Universal Serial Bus (USB) and Institute of Electrical and Electronics Engineers (IEEE) 1594 interface technologies. Other external drive connection technologies are within contemplation of the embodiments described herein.

The drives and their associated computer-readable storage media provide nonvolatile storage of data, data structures, computer-executable instructions, and so forth. For the computer 1502, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. The systems and methods described herein can be implemented utilizing various commercially available operating systems or combinations of operating systems.

Computer 1502 can optionally comprise emulation technologies. For example, a hypervisor (not shown) or other intermediary can emulate a hardware environment for operating system 1530, and the emulated hardware can optionally be different from the hardware illustrated in FIG. 15. In such an embodiment, operating system 1530 can comprise one virtual machine (VM) of multiple VMs hosted at computer 1502. Furthermore, operating system 1530 can provide runtime environments, such as the Java runtime environment or the .NET framework, for applications 1532. Runtime environments are consistent execution environments that allow applications 1532 to run on any operating system that includes the runtime environment. Similarly, operating system 1530 can support containers, and applications 1532 can be in the form of containers, which are lightweight, standalone, executable packages of software that include, e.g., code, runtime, system tools, system libraries and settings for an application.

Further, computer 1502 can comprise a security module, such as a trusted processing module (TPM). For instance, with a TPM, boot components hash next in time boot components, and wait for a match of results to secured values, before loading a next boot component. This process can take place at any layer in the code execution stack of computer 1502, e.g., applied at the application execution level or at the operating system (OS) kernel level, thereby enabling security at any level of code execution.

A user can enter commands and information into the computer 1502 through one or more wired/wireless input devices, e.g., a keyboard 1538, a touch screen 1540, and a pointing device, such as a mouse 1542. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1504 through an input device interface 1544 that can be coupled to the system bus 1508, but can be connected by other interfaces, such as a parallel port, an IEEE 1594 serial port, a game port, a USB port, an IR interface, a BLUETOOTH® interface, etc.

A monitor 1546 or other type of display device can be also connected to the system bus 1508 via an interface, such as a video adapter 1548. In addition to the monitor 1546, a computer typically includes other peripheral output devices (not shown), such as speakers, printers, etc.

The computer 1502 can operate in a networked environment using logical connections via wired and/or wireless communications to one or more remote computers, such as a remote computer(s) 1550. The remote computer(s) 1550 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1552 is illustrated. The logical connections depicted include wired/wireless connectivity to a local area network (LAN) 1554 and/or larger networks, e.g., a wide area network (WAN) 1556. Such LAN and WAN networking environments are commonplace in offices and companies, and facilitate enterprise-wide computer networks, such as intranets, all of which can connect to a global communications network, e.g., the internet.

When used in a LAN networking environment, the computer 1502 can be connected to the local network 1554 through a wired and/or wireless communication network interface or adapter 1558. The adapter 1558 can facilitate wired or wireless communication to the LAN 1554, which can also include a wireless access point (AP) disposed thereon for communicating with the adapter 1558 in a wireless mode.

When used in a WAN networking environment, the computer 1502 can include a modem 1560 or can be connected to a communications server on the WAN 1556 via other means for establishing communications over the WAN 1556, such as by way of the internet. The modem 1560, which can be internal or external and a wired or wireless device, can be connected to the system bus 1508 via the input device interface 1544. In a networked environment, program modules depicted relative to the computer 1502 or portions thereof, can be stored in the remote memory/storage device 1552. It will be appreciated that the network connections shown are examples and other means of establishing a communications link between the computers can be used.

When used in either a LAN or WAN networking environment, the computer 1502 can access cloud storage systems or other network-based storage systems in addition to, or in place of, external storage devices 1516 as described above. Generally, a connection between the computer 1502 and a cloud storage system can be established over a LAN 1554 or WAN 1556 e.g., by the adapter 1558 or modem 1560, respectively. Upon connecting the computer 1502 to an associated cloud storage system, the external storage interface 1526 can, with the aid of the adapter 1558 and/or modem 1560, manage storage provided by the cloud storage system as it would other types of external storage. For instance, the external storage interface 1526 can be configured to provide access to cloud storage sources as if those sources were physically connected to the computer 1502.

The computer 1502 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities. The terms "set" and "group" are used interchangeably herein.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," "subscriber station," "access terminal," "terminal," "handset," "communication device," "mobile device" (and/or terms representing similar termi-nology) can refer to a wireless device utilized by a sub-scriber or mobile device of a wireless communication ser-vice to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," "BS transceiver," "BS device," "cell site," "cell site device," "gNode B (gNB)," "evolved Node B (eNode B, eNB)," "home Node B (HNB)" and the like, refer to wireless network components or appliances that transmit and/or receive data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelli-gence (e.g., a capacity to make inference based on complex mathematical formalisms), which can provide simulated vision, sound recognition and so forth.

It should be noted that although various aspects and embodiments are described herein in the context of 5G, O-RAN, or other generation networks, the disclosed aspects are not limited to 5G or O-RAN implementations, and can be applied in other network next generation implementa-tions, such as sixth generation (6G), or other wireless systems. In this regard, aspects or features of the disclosed embodiments can be exploited in substantially any wireless communication technology. Such wireless communication technologies can include universal mobile telecommunica-tions system (UMTS), global system for mobile communication (GSM), code division multiple access (CDMA), wideband CDMA (WCMDA), CDMA2000, time division multiple access (TDMA), frequency division multiple access (FDMA), multi-carrier CDMA (MC-CDMA), single-carrier CDMA (SC-CDMA), single-carrier FDMA (SC-FDMA), orthogonal frequency division multiplexing (OFDM), discrete Fourier transform spread OFDM (DFT-spread OFDM), filter bank based multi-carrier (FBMC), zero tail DFT-spread-OFDM (ZT DFT-s-OFDM), general-ized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic pre-fix OFDM (CP-OFDM), resource-block-filtered OFDM, wireless fidelity (Wi-Fi), worldwide interoperability for microwave access (WiMAX), wireless local area network (WLAN), general packet radio service (GPRS), enhanced GPRS, third generation partnership project (3GPP), long term evolution (LTE), 5G, third generation partnership proj-ect 2 (3GPP2), ultra-mobile broadband (UMB), high speed packet access (HSPA), evolved high speed packet access (HSPA+), high-speed downlink packet access (HSDPA), high-speed uplink packet access (HSUPA), Zigbee, or another institute of electrical and electronics engineers (IEEE) 802.12 technology.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   monitoring, by a device comprising at least one processor, operation of a first control parameter, wherein the first control parameter is configured to control operation of a feature of network equipment that is part of a radio access network (RAN);
   based on a defined performance metric, detecting, by the device, a threshold degradation in performance of the operation of the feature resulting from usage of the first control parameter;
   identifying, by the device, a first operation of a first application (xApp) configured to adjust the first control parameter;
   identifying, by the device, a second operation of a second xApp operating to adjust the first control parameter; and
   in response to determining that the first operation and the second operation conflict to cause deleterious operation of the first control parameter:
      terminating, by the device, the first operation of the first xApp, and rolling back, by the device, the operation of the feature to a stored configuration from prior to the first xApp being implemented, wherein the first control parameter is modifiable by the second operation of the second xApp.

2. The method of claim 1, further comprising:

identifying, by the device, an adjustment of the operation of the feature to achieve the rolling back, the first xApp, the second xApp, and one or more conditions of the conflict; and storing, by the device, rollback information, wherein the rollback information comprises information representative of the adjustment, the first xApp, the second xApp, the first control parameter, the first operation of the first xApp, the second operation of the second xApp, and the conditions of the conflict.

3. The method of claim 2, further comprising:

receiving, by the device, a request to onboard a third xApp;

retrieving, by the device, subscription information of the third xApp based on the onboard request, wherein the subscription information comprises a second control parameter to be adjusted by the third xApp, and a third operation of the third xApp configured to adjust operation using the second control parameter;

comparing, by the device, the subscription information of the third xApp with the rollback information;

determining, by the device, the first control parameter and the second control parameter are a same parameter; and generating, by the device, a warning indicating the third xApp is configured to adjust operation using the first control parameter, wherein usage of the first control parameter has been determined to have been previously involved in a conflict between the first xApp and the second xApp.

4. The method of claim 3, further comprising:

based on the third xApp being configured to adjust the first control parameter, and the first control parameter being determined to be associated with a rollback, denying, by the device, the onboarding request of the third xApp.

5. The method of claim 1, wherein the RAN is an Open-RAN.

6. The method of claim 1, wherein the device is located in one of a real-time RAN intelligent controller (RIC), a near-real-time RIC, or a non-real-time RIC.

7. A system, comprising:

at least one processor, and a memory coupled to the at least one processor and having instructions stored thereon, wherein, in response to the at least one processor, the instructions facilitate performance of operations, comprising:

detecting a first state of a metric, wherein the metric relates to an operating condition of a radio access network (RAN);

detecting, according to a first defined criterion, a second state of the metric, wherein the second state of the metric is at a time subsequent to the first state and is in an operationally worse state than the first state;

identifying that the operationally worse state of the metric is as a result of first operation of a first application (xApp) configured to adjust the metric and second operation of a second xApp configured to adjust the metric;

identifying a first operational impact of the first xApp on one or more operations performed via network equipment of the RAN;

identifying a second operational impact of the second xApp on the one or more operations performed via the network equipment of the RAN;

in response to determining, according to a second defined criterion, that the first operation of the first xApp deleteriously affects the one or more operations performed via the network equipment of the RAN to a greater extent than a deleterious effect on the one or more operations by the second operation of the second xApp, terminating the first operation of the first xApp; and rolling back operation of the network equipment of the RAN to an operational state associated with a time from prior to implementation of the first xApp via the network equipment of the RAN.

8. The system of claim 7, wherein the operations further comprise:

compiling rollback data pertaining to the rolling back operation;

receiving, subsequent to the rolling back the operation of the network equipment of the RAN, an onboarding request from a third xApp;

extracting first information from the onboarding request; and determining that the onboarding request is directed to a control parameter to which the rollback data has been determined to be applicable.

9. The system of claim 8, wherein the operations further comprise:

in response to the onboarding request being determined to be directed to the control parameter to which the rollback data has been determined to be applicable, denying the onboarding request from the third Xapp.

10. The system of claim 8, wherein the operations further comprise:

generating warning data representative of a warning indicating that the third xApp is directed to the control parameter to which the rollback data has been determined to be applicable.

11. The system of claim 8, wherein the rollback data relates to an operational conflict between the second xApp configured to adjust the control parameter and the third xApp configured to adjust the control parameter.

12. The system of claim 8, wherein the operations further comprise:

obtaining the rollback data from a data store, and wherein the data store further comprises multiple rollback events applicable to the control parameter.

13. The system of claim 7, wherein the RAN is an Open-RAN.

14. The system of claim 7, wherein the system is one of a real-time RAN intelligent controller (RIC), a near-real-time RIC, or a non-real-time RIC.

15. A computer program product stored on a non-transitory computer-readable medium and comprising machine-executable instructions, wherein, in response to being executed, the machine-executable instructions cause a machine to perform operations, comprising:

detecting a first state of a metric, wherein the metric relates to an operating condition of a radio access network (RAN);

detecting, according to a first defined criterion, a second state of the metric, wherein the second state of the metric is at a time subsequent to the first state and is in an operationally worse state than the first state;

identifying that the operationally worse state of the metric is as a result of operation of a first application (xApp)

configured to adjust the metric and operation of a second xApp configured to adjust the metric;

identifying a first operational impact of the first xApp on one or more operations performed via network equipment of the RAN;

identifying a second operational impact of the second xApp on the one or more operations performed via the network equipment of the RAN;

in response to determining, according to a second defined criterion, that the first xApp negatively impacts the one or more operations performed via the network equipment of the RAN to a greater extent than a negative impact on the one or more operations by the second xApp, terminating operation of the first xApp; and rolling back operation of the network equipment of the RAN to an operational state associated with a time from prior to implementation of the first xApp via the network equipment of the RAN.

16. The computer program product according to claim 15, wherein the operations further comprise:

receiving an onboarding request from a third xApp;

identifying that the third xApp is configured to adjust usage of the metric;

comparing a configuration of the third xApp with a configuration of the first xApp;

based on a result of the comparing, determining, according to a defined similarity criterion, that the configuration of the third xApp is threshold similar to the configuration of the first xApp; and in response to determining that the third xApp and the first xApp are threshold similar, denying the onboarding request from the third xApp.

17. The computer program product according to claim 16, wherein the operations further comprise:

generating and communicating a warning that the third xApp has been denied onboarding according to the onboarding request.

18. The computer program product according to claim 15, wherein the RAN is an Open-RAN.

19. The computer program product according to claim 15, wherein the system is one of a real-time RAN intelligent controller (RIC), a near-real-time RIC, or a non-real-time RIC.

20. The computer program product according to claim 17, wherein the operations further comprise communicating the warning to a network operator overseeing operation of at least one component located in the RAN.

* * * * *